(12) United States Patent
Kawabata et al.

(10) Patent No.: US 7,882,644 B2
(45) Date of Patent: Feb. 8, 2011

(54) ALIGNMENT ADJUSTING MECHANISM AND MEASURING INSTRUMENT

(75) Inventors: Takeshi Kawabata, Kawasaki (JP); Takeshi Yamamoto, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

(21) Appl. No.: 12/787,903

(22) Filed: May 26, 2010

(65) Prior Publication Data

US 2010/0299946 A1 Dec. 2, 2010

(30) Foreign Application Priority Data

May 26, 2009 (JP) ............................. 2009-126237
Mar. 18, 2010 (JP) ............................. 2010-062239

(51) Int. Cl.
*G01B 3/00* (2006.01)
*G01B 7/03* (2006.01)

(52) U.S. Cl. .......................................... 33/556; 33/559

(58) Field of Classification Search .................. 33/556, 33/557, 558, 559, 560, 561, 503, 1 M
See application file for complete search history.

(56) References Cited

U.S. PATENT DOCUMENTS

| | | | | |
|---|---|---|---|---|
| 4,939,678 A | * | 7/1990 | Beckwith, Jr. | ............... 33/1 M |
| 6,430,828 B1 | * | 8/2002 | Ulbrich | ....................... 33/503 |
| 6,594,532 B2 | * | 7/2003 | Mills | ............................. 33/556 |
| 6,694,634 B2 | * | 2/2004 | Sato et al. | ...................... 33/503 |
| 6,810,600 B1 | * | 11/2004 | Horwarth et al. | ............... 33/503 |
| 7,222,431 B1 | * | 5/2007 | Norton et al. | ................. 33/1 M |
| 7,222,434 B2 | * | 5/2007 | Kikuchi | ........................ 33/503 |
| 7,607,234 B2 | * | 10/2009 | Tada et al. | ..................... 33/1 M |
| 7,698,829 B2 | * | 4/2010 | Lutz | ............................. 33/503 |
| 2003/0019119 A1 | * | 1/2003 | Sato et al. | ...................... 33/503 |
| 2010/0132432 A1 | * | 6/2010 | Wallace et al. | ................. 33/503 |
| 2010/0146802 A1 | * | 6/2010 | Ehlerding | ..................... 33/503 |

FOREIGN PATENT DOCUMENTS

JP 11-142141 5/1999
JP 2003-057026 2/2003

* cited by examiner

*Primary Examiner*—Yaritza Guadalupe-McCall
(74) *Attorney, Agent, or Firm*—Rankin, Hill & Clark LLP

(57) ABSTRACT

An alignment mechanism includes: an adjusting plate having first and second adjustment ends parallel to an X axis direction; a probe fixing portion provided to the adjusting plate; a probe fixed to the probe fixing portion; a reinforcing plate having first and second base ends parallel to the X axis direction, displacement of the reinforcing portion in a Y axis direction being restricted; Y-direction adjusting screws for pressing the adjusting plate in the Y axis direction; and adjustment connectors for respectively connecting the first adjustment end with the first base end and the second adjustment end with the second base end. A stylus of the probe is disposed on a line of intersection of a first inclined surface including the first adjustment end and the first base end and a second inclined surface including the second adjustment end and the second base end.

5 Claims, 18 Drawing Sheets

US 7,882,644 B2

ALIGNMENT ADJUSTING MECHANISM AND MEASURING INSTRUMENT

The entire disclosure of Japanese Patent Application No. 2009-126237, filed May 26, 2009, and No. 2010-062239, filed Mar. 18, 2010, is expressly incorporated by reference herein.

BACKGROUND OF THE INVENTION

1. Field of the Invention

The present invention relates to an alignment adjusting mechanism for adjusting alignment of a probe and a measuring instrument.

2. Description of Related Art

There has conventionally been known a measuring instrument for measuring a profile of an object to be measured, including a probe provided with a stylus at a shaft tip, the probe and the object being relatively moved to bring the stylus into contact with a measurement portion of the object, whereby the profile of the object is measured from coordinates when the stylus is in contact with the object (see, for instance, Patent Document 1: JP-A-11-142141).

The instrument disclosed in Patent Document 1 includes a non-contact roughness probe for measuring surface roughness of the object and a touch signal probe having a stylus. When the stylus is displaced, a touch signal is output by a touch signal generator.

However, when a circumferential surface profile, cylindricity, depth and the like of a hole such as a screw hole and a deep hole are measured by using the above-described probe, inclination of a shaft 8B of a probe 8 relative to a center of a hole 901 as shown in FIG. 16 causes the shaft 8B to contact with a circumferential wall of the hole 901, thereby damaging the object or the probe 8. In order to solve such a problem, an arrangement in which a posture of a stylus is adjusted (alignment adjustment) has been proposed.

FIG. 17 illustrates a conventional alignment adjusting mechanism of a probe. FIG. 18 illustrates another conventional alignment adjusting mechanism of a probe.

As shown in FIG. 17, the conventional alignment adjusting mechanism is provided with a pin 903 formed at one end of a probe holder 902 for holding the probe 8 and is rotatably held by a bearing 906 of a base 905 that is fixed to a measuring instrument body 904. At the other end of the probe holder 902, a tension spring 907 is provided for biasing the probe holder 902 toward the base 905 and a push-in screw 908 is inserted into the probe holder 902. In accordance with a push-in dimension of the push-in screw 908, the probe holder 902 is rotated around the pin 903 to adjust the alignment of the probe 8.

FIG. 18 exemplarily shows another arrangement in which the probe 8 is fixed to a goniostage 909 fixed to the measuring instrument body 904. Specifically, the goniostage 909 includes a first stage 910 having a first circular sliding surface 910A and a second stage 911 having a second circular sliding surface 911A slidably connected to the first sliding surface 910A of the first stage 910. The probe 8 is fixed to the second stage 911. By sliding the second sliding surface 911A of the second stage 911 against the first sliding surface 910A of the first stage 910, the alignment of the probe 8 is adjusted. However, the alignment adjustment of the probe 8 according to the above conventional arrangements shown in FIGS. 17 and 18 causes a large displacement of a position of a stylus 8C. Particularly, when a fine profile is measured, alignment adjustment needs to be performed while the position of the stylus 8C of the probe 8 is confirmed by a microscope. However, when the position of the stylus 8C is largely displaced as described above, the stylus is out of a visual field of the microscope and the position of the microscope needs to be re-adjusted, which may lead to complication of operation(s). Furthermore, in the arrangement including the goniostage as shown in FIG. 18, when the goniostage is attached to a measuring instrument for particularly measuring a profile of a small-sized object (e.g., several mm in size), it is difficult to control a rotation angle of the second stage 911 and to manufacture the sliding surfaces 910A and 911A of the first and the second stages 910 and 911 respectively.

SUMMARY OF THE INVENTION

In consideration of such a problem as described above, an object of the invention is to provide an alignment adjusting mechanism capable of alignment adjustment of a probe and a measuring instrument while locating a stylus at the same position.

An alignment adjusting mechanism according to an aspect of the invention includes: an adjusting plate having a first adjustment end and a second adjustment end which are parallel to each other in a first direction; a probe fixing portion integrated with the adjusting plate; a probe that is fixed to the probe fixing portion and that has a shaft and a stylus formed on a tip of the shaft; a base that is connected with a measuring instrument body and that has a first base end and a second base end which are parallel to each other in the first direction; an inclination adjuster that presses the adjusting plate in a direction parallel to a planar direction of the adjusting plate and substantially in a second direction orthogonal to the first direction; and adjustment connectors that respectively connect the first adjustment end with the first base end and the second adjustment end with the second base end, in which the base is connected with the measuring instrument body while a displacement of the base in the second direction is restricted, and the stylus is disposed on a line of intersection of: a first inclined surface including the first adjustment end of the adjusting plate and the first base end of the base; and a second inclined surface including the second adjustment end of the adjusting plate and the second base end of the base, when the adjusting plate is not pressed by the inclination adjuster.

According to the aspect of the invention, the adjustment connector connects the adjusting plate integrated with the probe fixing portion and the base of which displacement in the second direction is restricted. In such an alignment adjusting mechanism, the displacement of the base in the second direction is restricted. Accordingly, when the inclined plate is pressed along the second direction by the inclination adjuster, the first and second adjustment ends of the adjusting plate are respectively swung around the first and second base ends to incline the adjusting plate. Consequently, the probe fixing portion integrated with the adjusting plate and the probe fixed to the probe fixing portion are also inclined. Thus, alignment adjustment is performed.

Here, positions and sizes of the base and the adjusting plate are set such that the stylus is disposed on the line of intersection of: the first inclined surface that is formed by the first adjustment end and the first base end; and the second inclined surface that is formed by the second adjustment end and the second base end. With this arrangement, a displacement of the stylus caused by a displacement of the adjusting plate can be restrained at a small level.

Specifically, in a conventional arrangement, for instance, as shown in FIG. 17, the stylus 8C is moved along an arc around the pin 903. In another conventional arrangement as shown in FIG. 18, the stylus 8C is moved along an arc around the center of each of the sliding surfaces 910A and 911A. However, since these arc centers are positioned apart from the stylus 8C, the displacement of the stylus 8C in adjusting the alignment becomes large. In contrast, according to the aspect of the invention, when the adjusting plate is pressed, the first adjustment end is swung around the first base end (serving as a center axis) and the second adjustment end is swung around the second base end (serving as a center axis). An entirety of the adjusting plate is swung substantailly around the line of intersection of the first and second inclined surfaces (substantailly serving as a center axis). Accordingly, as long as the stylus is disposed on the line of intersection of the first and second inclined surfaces in the initial state as described above, even when the inclined plate is inclined by swinging, the stylus is only slightly displaced in the proximity of the line of intersection of the first and second inclined surfaces, which is not largely displaced contrary to a conventional arrangement. Accordingly, even when alignment adjustment of the probe is performed while the position of the stylus is confirmed by a microscope, the stylus can be prevented from being out of the visual field of the microscope and alignment adjustment of the probe can easily be performed. Moreover, since such a simple arrangement as the adjusting plate is only pressed along the second direction, a complicated arrangement and control such as the goniostage as shown in FIG. 18 are unnecessary, thereby providing a smaller-sized alignment adjusting mechanism.

In the alignment adjusting mechanism according to the aspect of the invention, the adjustment connector is preferably disposed along the first and second inclined surfaces.

In the aspect of the invention, the adjustment connector may be formed in any shape as long as the adjustment connector connects the first adjustment end with the first base end and connects the second adjustment end with the second base end. However, by providing the adjustment connector along the first and second inclined surfaces, a simpler arrangement can be obtained and down-sizing of the instrument can be also facilitated.

In the alignment adjusting mechanism according to the aspect of the invention, the adjustment connector is a plate spring and biases the adjusting plate to a position at which the adjusting plate is not pressed by the inclination adjuster.

In the aspect of the invention, the plate spring connecting the base and the adjusting plate is disposed along the first and second inclined surfaces. The first adjustment end and the second adjustment end may be respectively connected with the first base end and the second base end by a plurality of linear elastic members serving as the adjustment connector. In this arrangement, when being pressed by the inclination adjuster, the elastic materials may receive stress different from each other. In such a case, even when the adjusting plate is pressed in the second direction by the inclination adjuster, different flexure of each elastic material causes an inclination of the adjusting plate in the first direction, which makes alignment adjustment difficult. On the other hand, when the first adjustment end and the second adjustment end are respectively connected with the first base end and the second base end by a plate member along the first and second inclined surfaces, a pressing force by the inclination adjuster is evenly dispersed over the plate-shaped adjustment connector, so that the adjusting plate is not inclined in the first direction.

In such an arrangement in which the plate member is used as the adjustment connector, hard plates may be disposed along the first and second inclined surfaces and may be respectively connected with the base ends and the adjusting plate ends by a plate spring. However, by providing the adjustment connector with use of the plate spring, the number of parts can be reduced, thereby providing a simpler arrangement.

The alignment adjusting mechanism according to the aspect of the invention preferably includes a second inclination adjuster that presses the adjusting plate in a direction parallel to the planar direction of the adjusting plate and substantially in the first direction, in which the base includes: a base fixing portion that is fixed to the measuring instrument body and that has a third base end and a fourth base end parallel to the second direction; a base swinging portion that has a fifth base end and a sixth base end parallel to the second direction as well as the first base end and the second base end; and base connecting portions that respectively connect the third adjustment end with the fifth base end and the fourth base end with the sixth base end, and the stylus is disposed on a point of intersection of: the line of intersection of the first inclined surface and the second inclined surface; and the line of intersection of a third inclined surface including the third base end and the fifth base end and a fourth inclined surface including the fourth base end and the sixth base end, when the adjusting plate is not pressed by the inclination adjuster and the second inclination adjuster.

In the aspect of the invention, since the base fixing portion is fixed to the instrument body, the displacements of the base fixing portion in the first and second directions are restricted. Moreover, in this alignment adjusting mechanism, the third base end and the fourth base end in the second direction of the base fixing portion are respectively connected with the fifth base end and the sixth base end in the second direction of the base swinging portion. Since the displacement of the base in the second direction is restricted as described above, the base swinging portion is not displaced in the second direction even when the adjusting plate is pressed along the second direction by the inclination adjuster. On the other hand, when the adjusting plate is pressed along the first direction by the second inclination adjuster, the base swinging portion, which is connected with the adjusting plate through the adjustment connector, is also displaced in conjunction with the adjusting plate. At this time, the fifth base end and the sixth base end of the base swinging portion are respectively swung around the third base end and the fourth base end of the base fixing portion, so that the base swinging portion is inclined. Consequently, the adjusting plate connected to the base swinging portion, the probe fixing portion integrated with the adjusting plate and the probe fixed to the probe fixing portion are also inclined. Thus, alignment adjustment is performed.

Here, positions and sizes of the base and the adjusting plate are set such that the stylus is disposed on a point of intersection of the line of intersection of the first and second inclined surfaces and the line of intersection of the third and fourth inclined surfaces. Accordingly, the displacement of the stylus caused by the displacement of the adjusting plate can be restrained at a small level even when the adjusting plate is pressed in either the first direction or the second direction. The probe can be inclined in the second direction as well as in the first direction while the stylus is located substantially at the same position, thereby performing more precise alignment adjustment.

A measuring instrument according to another aspect of the invention includes: an adjusting plate having a first adjustment end and a second adjustment end which are parallel to each other in a first direction; a probe fixing portion integrated with the adjusting plate; a probe that is fixed to the probe fixing portion and that has a shaft and a stylus formed on a tip of the shaft; a base that is connected with a measuring instrument body and that has a first base end and a second base end which are parallel to each other in the first direction; an inclination adjuster that presses the adjusting plate in a direction parallel to a planar direction of the adjusting plate and substantially in a second direction orthogonal to the first direction; and adjustment connectors that respectively connect the first adjustment end with the first base end and the second adjustment end with the second base end, and a measuring unit that detects a position of the stylus when the stylus is in contact with an object to be measured to measure a profile of the object, in which the base is connected with the measuring instrument body while a displacement of the base in the second direction is restricted, and the stylus is disposed on a line of intersection of: a first inclined surface including the first adjustment end of the adjusting plate and the first base end of the base; and a second inclined surface including the second adjustment end of the adjusting plate and the second base end of the base, when the adjusting plate is not pressed by the inclination adjuster.

In this measuring instrument, similar to the above alignment adjusting mechanism, the stylus is disposed on the line of intersection of the first and second inclined surfaces in the initial state. Accordingly, even when the inclined plate is inclined by swinging, the stylus is only slightly displaced in the proximity of the line of intersection of the first and second inclined surfaces. In short, a position of the stylus is not substantially moved. Accordingly, even when alignment adjustment of the probe is performed while the position of the stylus is confirmed by a microscope, the stylus can be prevented from being out of the visual field of the microscope and alignment adjustment of the probe can easily be performed. Moreover, since such a simple arrangement as the adjusting plate is only pressed along the second direction, a complicated arrangement and control such as the goniostage as shown in FIG. 18 are unnecessary, thereby providing a smaller-sized alignment adjusting mechanism.

DETAILED DESCRIPTION OF PREFERRED EMBODIMENT(S)

Arrangement of Profile Measuring Instrument as Measuring Instrument

Figure 1:
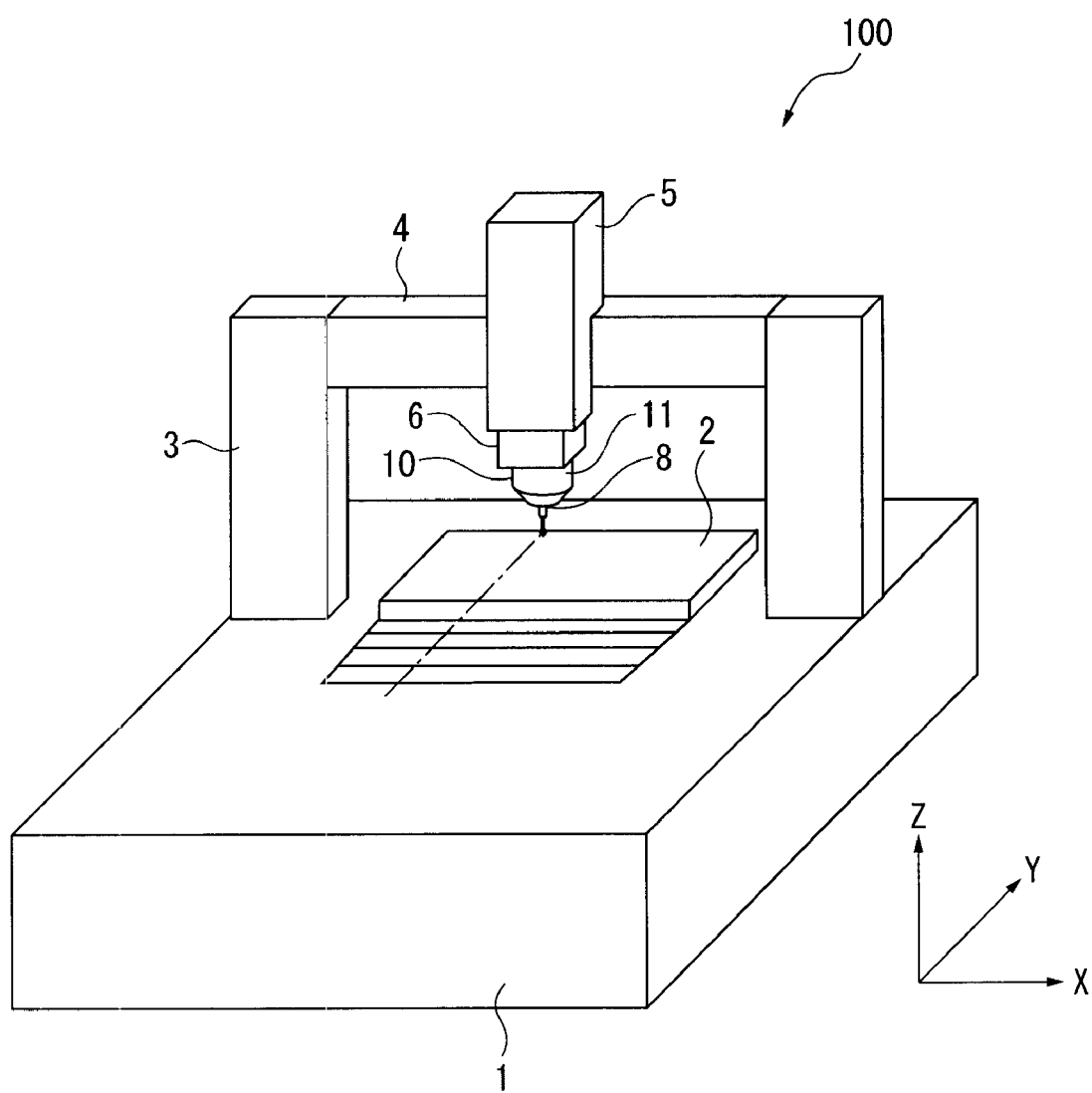
FIG. 1 is an overall view schematically showing a profile measuring instrument as a measuring instrument according to an exemplary embodiment of the invention.

FIG. 1 is an overall view schematically showing a profile measuring instrument (a measuring instrument) according to an exemplary embodiment of the invention.

As shown in FIG. 1, a profile measuring instrument 100 according to the exemplary embodiment of the invention includes: a platform 1; a table 2 that holds an object to be measured and is movable in a front-back direction (Y axis direction); a portal frame 3 provided on both sides of the platform 1 bridging over the table 2; an X-slider 5 that is provided on a cross rail 4 of the portal frame 3 and is movable in a left-right direction (X axis direction); a Z-slider 6 that is provided to the X-slider 5 and is movable in a vertical direction (Z axis direction); and an alignment adjusting mechanism 10 that is provided to a lower end of the Z-slider 6 and is fixed with the probe 8. The profile measuring instrument is connected to a controller (not shown), the controller controlling displacements of the table 2 in the Y axis direction, the X-slider 5 in the X axis direction and the Z-slider in the Z axis direction. While relatively moving the probe 8 and the table 2, the controller brings a stylus 8C of the probe 8 (see FIG. 2) into contact with a measurement portion of an object to be measured and reads a coordinate value when the stylus 8C is in contact with the object, thereby measuring a profile of the object.

Arrangement of Alignment Adjusting Mechanism

Figure 2:
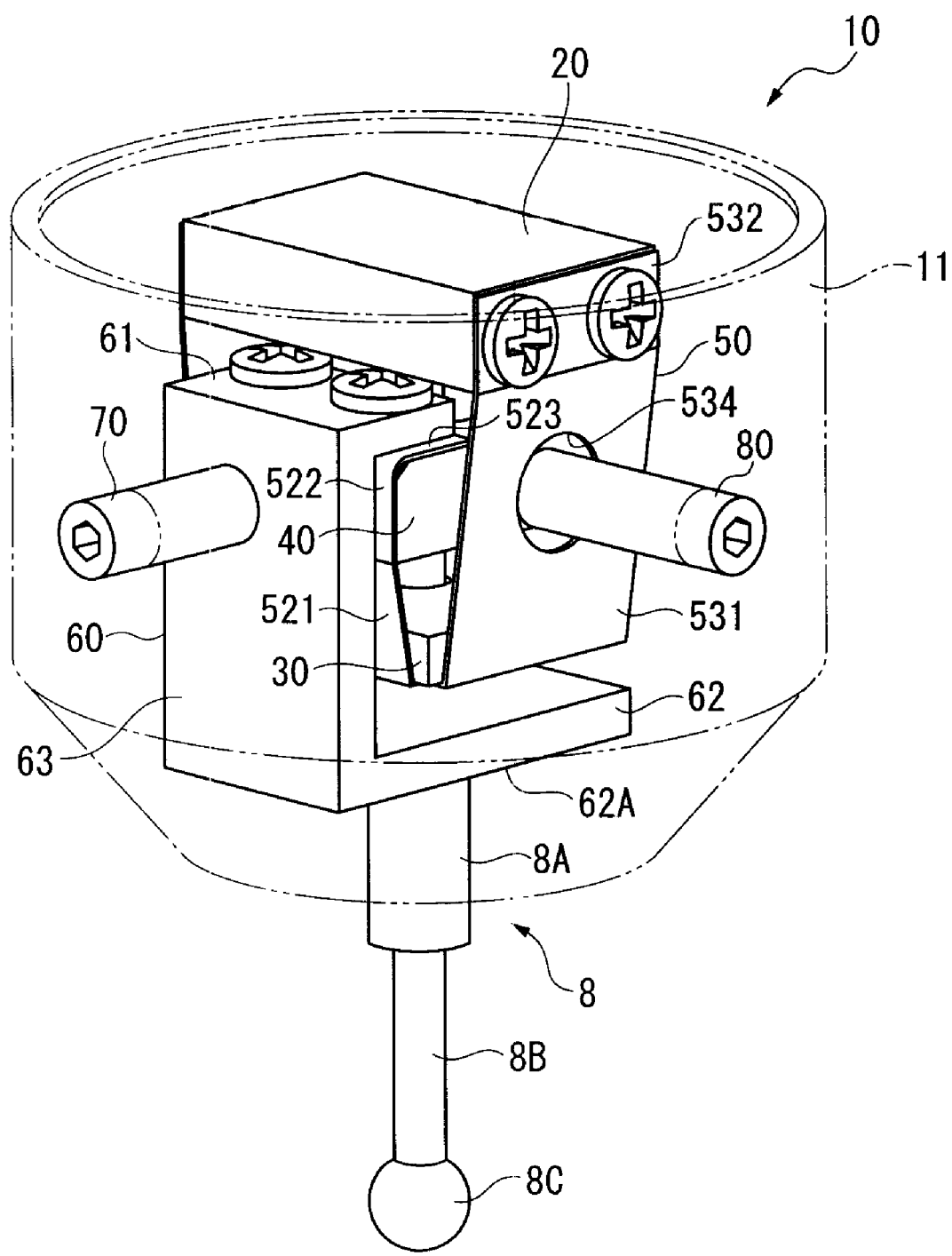
FIG. 2 is a perspective view showing an arrangement of an alignment adjusting mechanism according to the exemplary embodiment.
Figure 3:
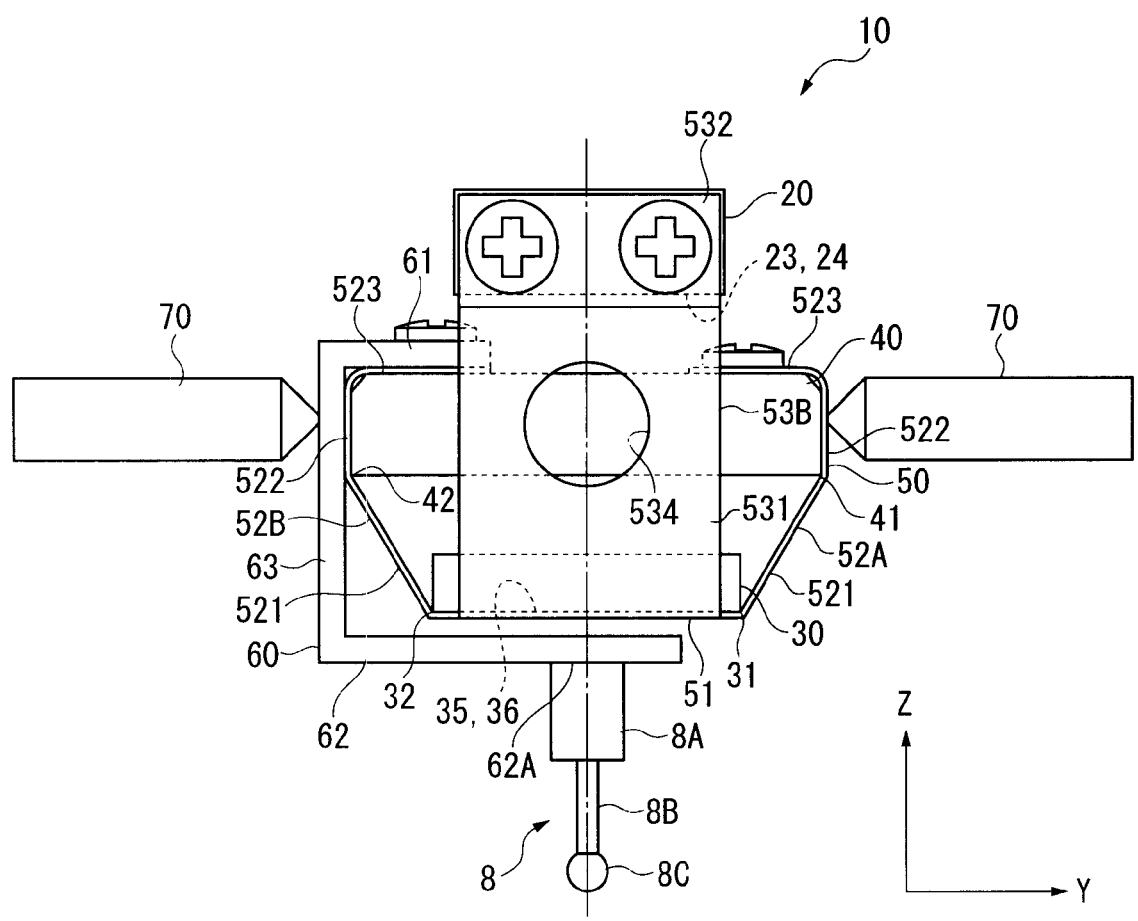
FIG. 3 is a front view showing the alignment adjusting mechanism according to the exemplary embodiment seen in an X axis direction.
Figure 4:
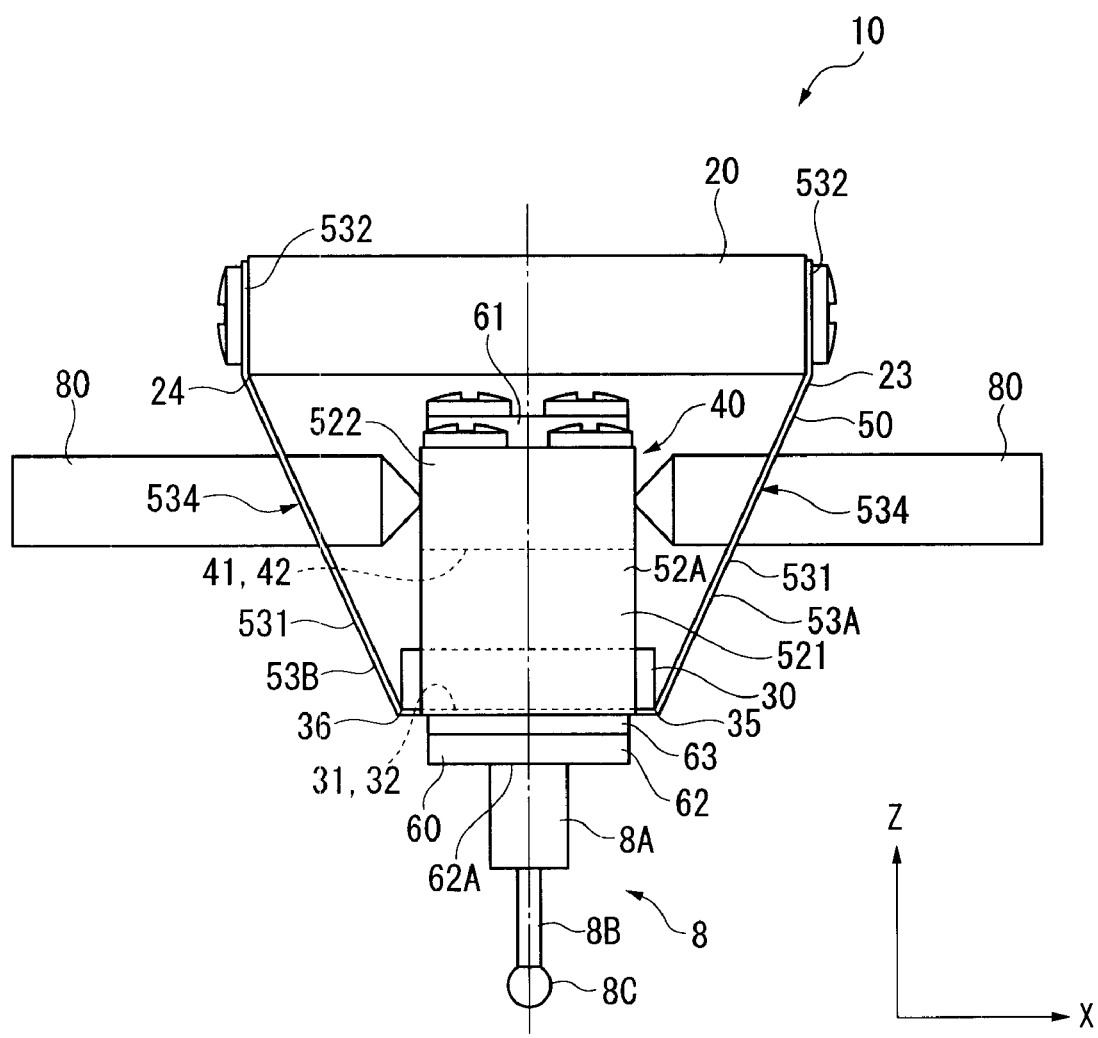
FIG. 4 is a lateral view showing the alignment adjusting mechanism according to the exemplary embodiment seen in a Y axis direction.

FIG. 2 is a perspective view showing an arrangement of the alignment adjusting mechanism 10. FIG. 3 is a front view showing the alignment adjusting mechanism 10 seen in the X axis direction. FIG. 4 is a lateral view showing the alignment adjusting mechanism seen in the Y axis direction.

As shown in FIGS. 2 to 4, the probe 8 includes a probe body 8A, a shaft 8B and the stylus 8C.

The probe body 8A is fixed at an angle orthogonal to a fixing surface 62A of a probe fixing portion 60 of the alignment adjusting mechanism 10.

The shaft 8B is formed of, for instance, ultra-hard alloy. Moreover, the shaft 8B is inclinable relative to the probe body 8A and recoverable to a reference posture that is orthogonal to the fixing surface of the probe fixing portion 60.

In other words, the profile measuring instrument 100 according to the exemplary embodiment brings the stylus 8C into contact with the measurement portion of the object to read coordinates at the contact position. At this time, whether the stylus 8C is in contact with the measurement portion can be judged by detecting an inclined state of the shaft 8B when the stylus 8C is in contact with the object. For this purpose, the shaft 8B, which is formed of, for instance, ultra-hard alloy, is inclinable to the probe body 8A when the stylus 8C is in contact with the object and is recoverable to the reference posture orthogonal to the fixing surface of the probe fixing portion 60 when the stylus 8C is apart from the object.

Moreover, whether the stylus 8C is in contact with the measurement portion can also be judged by slightly vibrating the stylus 8C and detecting a vibration state of the stylus 8C when the stylus 8C is in contact with the measurement portion. Also in this case, since the stylus 8C needs to be slightly vibrated, the shaft 8B needs to be formed to be capable of being vibrated around the reference posture orthogonal to the fixing surface of the probe fixing portion 60. In other words, the shaft 8B is inclinable to the probe body 8A and is recoverable to the reference posture orthogonal to the fixing surface of the probe fixing portion 60.

The stylus 8C is, for instance, integrally formed in a sphere on a tip of the shaft 8B.

In the profile measuring instrument 100, as described above, when the stylus 8C is brought into contact with the object and the shaft 8B becomes inclined to a certain extent, a contact signal is output to the controller (not shown) as a measuring unit. This controller calculates a profile of a measurement surface of the object according to the contact signal.

In the profile measuring instrument 100, the stylus 8C may be slightly vibrated as described above and when the vibration is changed, a contact signal may be output to the controller. Also in this case, the controller can arithmetically measure the profile of the measurement surface of the object according to the contact signal.

The alignment adjusting mechanism 10, which adjusts a posture (angle) of the probe 8, includes an external cylinder 11 (see FIGS. 1 and 2), a base fixing portion 20, a reinforcing plate 30 constituting a base swinging portion, an adjusting plate 40, a plate spring 50 constituting a base connector and an adjustment connector, the probe fixing portion 60, Y-direction adjusting screws 70 as an inclination adjuster and X-direction adjusting screws 80 as a second inclination adjuster, as shown in FIGS. 2 to 4.

The base according to the aspect of the invention is provided by the base fixing portion 20, the reinforcing plate 30, and X-direction plate springs 53A and 53B constituting the plate spring 50. A first direction according to the aspect of the invention refers to the X axis direction of the exemplary embodiment of the invention. A second direction according to the aspect of the invention refers to the Y axis direction of the exemplary embodiment of the invention.

As shown in FIGS. 2 to 4, the base fixing portion 20, the reinforcing plate 30 and the adjusting plate 40 are formed in a rectangular parallelepiped (plate shape) having a pair of parallel surfaces relative to an XY plane, a YZ plane and a ZX plane respectively, while the adjusting plate 40 is not pressed by the adjusting screws 70 and 80. Here, a width of the base fixing portion 20 in the X axis direction is larger than that of the reinforcing plate 30 in the X axis direction. A width of the adjusting plate 40 in the Y axis direction is lager than that of the reinforcing plate 30 in the Y axis direction. A width of the base fixing portion 20 in the Y axis direction is substantially the same as that of the reinforcing plate 30 in the Y axis direction. A width of the adjusting plate 40 in the X axis direction is the same as that of the reinforcing plate 30 in the X axis direction.

In this exemplary embodiment of the invention, the dimension of the base fixing portion 20 in the Y axis direction and the dimension of the adjusting plate 40 in the X axis direction are exemplarily formed in such a dimension as noted above. However, the dimension is not limited to the above. The base fixing portion 20 and the adjusting plate 40 may be formed in any dimensions as long as the base fixing portion 20 and the adjusting plate 40 can be received in the external cylinder 11 and do not interfere with the plate spring 50 after being inclined.

The base fixing portion 20, the reinforcing plate 30 and the adjusting plate 40 are arranged in the Z axis direction in an order of the base fixing portion 20, the adjusting plate 40 and the reinforcing plate 30. Specifically, the base fixing portion 20 is fixed to a lower end surface of the Z-slider 6. The adjusting plate 40 is disposed at a predetermined interval from the base fixing portion 20. Further, the reinforcing plate 30 is disposed at a predetermined interval from the adjusting plate 40. At this time, while the adjusting plate 40 is not pressed by the adjusting screws 70 and 80, a center on an XY end surface of each of the base fixing portion 20, the reinforcing plate 30 and the adjusting plate 40 is arranged so as to be located on the Z axis or a straight line parallel to the Z axis.

A pair of ends in the Y axis direction, which are located on a lower surface of the XY end surfaces of the base fixing portion 20 and opposing the adjusting plate 40, are respectively defined as third base end 23 (+X side) and a fourth base end 24 (−X side). A pair of ends of the reinforcing plate 30 in the X axis direction are respectively defined as a first base end 31 (+Y side) and a second base end 32 (−Y side). A pair of ends of the reinforcing plate 30 in the Y axis direction are respectively defined as a fifth base end 35 (+X side) and a sixth base end 36 (−X side). A pair of ends of the adjusting plate 40 in the X axis direction are respectively defined as a first adjustment end 41 (+Y side) and a second adjustment end 42 (−Y side).

The base fixing portion 20, the reinforcing plate 30 and the adjusting plate 40 are respectively held at a height by being connected by the plate spring 50.

Figure 5:
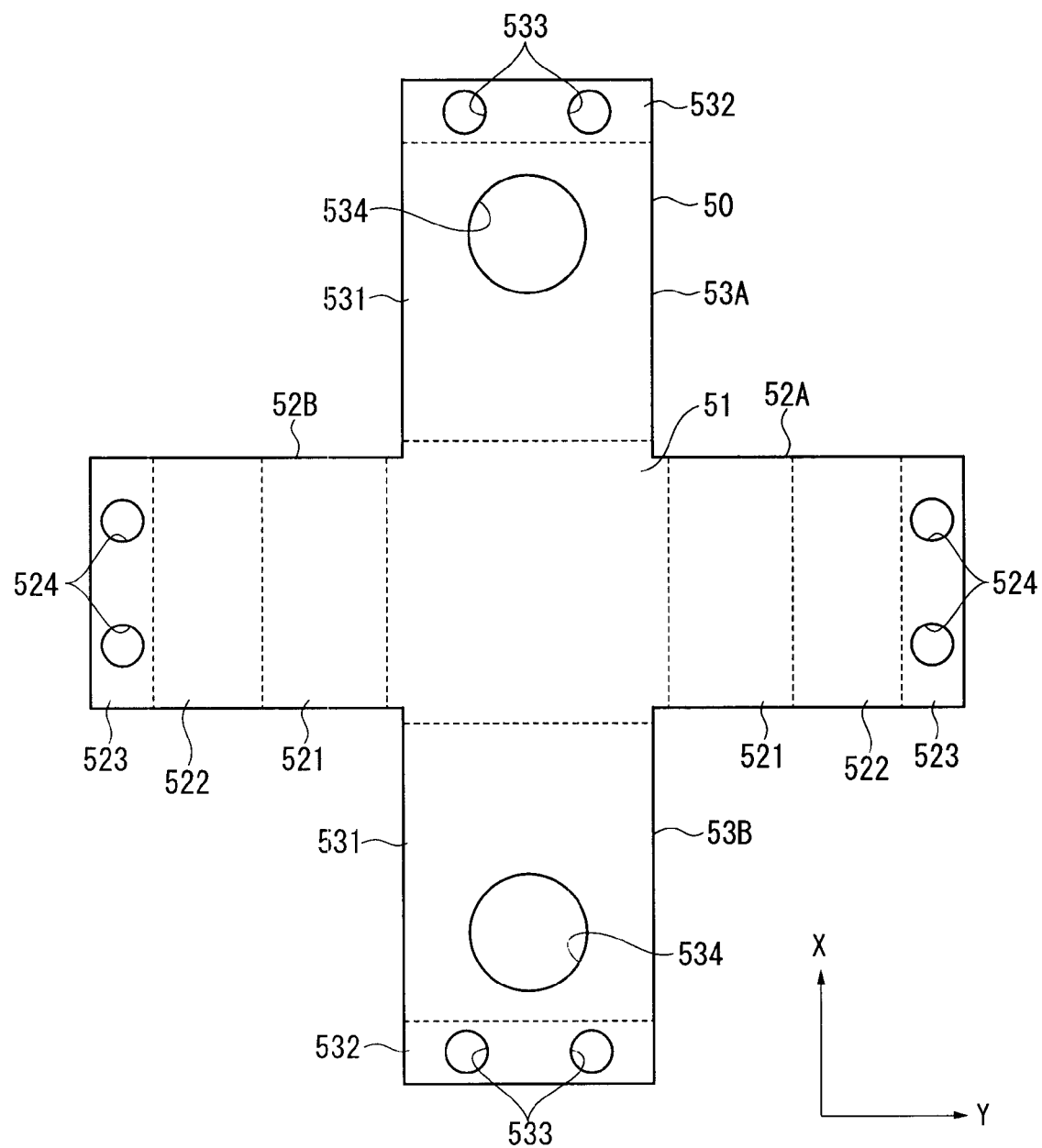
FIG. 5 is a plan view showing a shape of a plate spring according to the exemplary embodiment.
Figure 6:
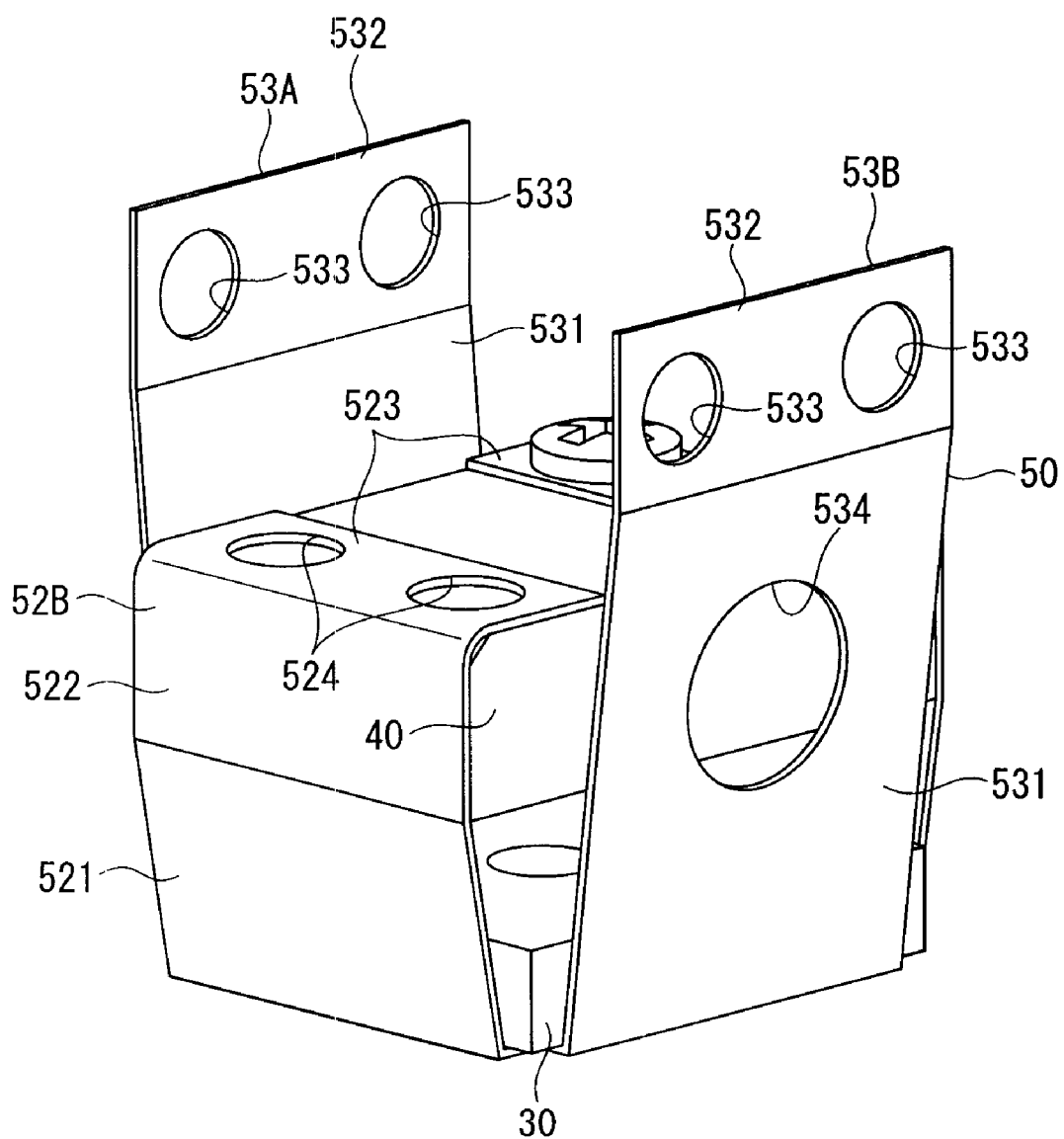
FIG. 6 is a perspective view showing an adjusting plate and a reinforcing plate that are connected to each other by the plate spring according to the exemplary embodiment.

FIG. 5 is a plan view showing a shape of the plate spring 50. FIG. 6 is a perspective view showing the adjusting plate 40 and the reinforcing plate 30 that are connected to each other by the plate spring 50.

The plate spring 50 includes a bottom 51, a pair of Y-direction plate springs 52A and 52B, and a pair of X-direction plate springs 53A and 53B. The plate spring 50 is formed by, for instance, an Invar (trademark) material exhibiting a small thermal expansion coefficient to have a 0.1-mm thickness.

The bottom 51 is formed in substantially the same rectangular shape as the XY surface of the reinforcing plate 30 and is fixed to a lower surface of the reinforcing plate 30, for instance, by being screwed.

As shown in FIG. 5, the Y-direction plate springs 52A and 52B extended from the bottom in the Y axis direction. The Y-direction plate springs 52A and 52B each include an adjustment connector 521 integrated with the bottom 51, an adjustment abutting portion 522 integrated with the adjustment connector 521, and an adjustment fixing portion 523 integrated with the adjustment abutting portion 522, in which the adjustment fixing portion 523 is formed with a screw hole 524. As shown in FIG. 6, the Y-direction plate spring 52A is bent substantially along the first base end 31 of the reinforcing plate 30, the first adjustment end 41 of the adjusting plate 40 and an end along the X axis of an upper surface of the adjusting plate 40. Then, the Y-direction plate spring 52A is screwed to the upper surface of the adjusting plate 40. Similarly, the Y-direction plate spring 52B is bent substantially along the second base end 32 of the reinforcing plate 30, the second adjustment end 42 of the adjusting plate 40 and an end in the X axis of the upper surface of the adjusting plate 40. Then, the Y-direction plate springs 52B is screwed to the upper surface of the adjusting plate 40. At this time, the Y-direction plate springs 52B is screwed to the upper surface of the adjusting plate 40 while being interposed between a fixing piece 61 (described below) of the probe fixing portion 60 and the adjusting plate 40. With this arrangement, the adjustment connectors 521 of the Y-direction plate springs 52A and 52B are respectively disposed along a first inclined surface including the first base end 31 and the first adjustment end41, and a second inclined surface including the second base end 32 and the second adjustment end 42.

In an initial state where the adjusting plate 40 is not affected by a pressing force, the stylus 8C is disposed on a line of intersection of the first inclined surface and the second inclined surface along the adjustment connectors 521 of the Y-direction plate springs 52A and 52B. The Y-direction plate springs 52A and 52B bias the adjusting plate 40 in the Y axis direction such that the reinforcing plate 30 and the adjusting plate 40 are relatively positioned to be the above initial state.

On the other hand, the adjustment connectors 521, which are disposed on a surface parallel to the X axis, are not bent in the X axis direction. In other words, a displacement of the adjusting plate 40 in the X axis direction relative to the reinforcing plate 30 can be restricted. Accordingly, when the adjusting plate 40 is pressed in the X axis direction by the X-direction adjusting screws 80, the reinforcing plate 30 is integrally swung at the same distance substantially in the same direction as the adjusting plate 40.

As shown in FIG. 5, the X-direction plate springs 53A and 53B extend from the bottom 51 in the X axis direction. The X-direction plate springs 53A and 53B each include a base connector 531 integrated with the bottom 51 and a base fixing portion 532 integrated with the base connector 531, in which the base fixing portion 532 is formed with screw holes 533 and the base connector 531 is formed with an adjusting screw hole 534 through which the X-direction adjusting screw 80 is inserted. As shown in FIG. 6, the X-direction plate spring 53A is bent substantially along the fifth base end 35 of the reinforcing plate 30 and the third base end 23 of the base fixing portion 20. Then, the X-direction plate spring 53A is fixed with a screw to a YZ end surface on the +X side of the base fixing portion 20. Similarly, the X-direction plate spring 53B is bent along the sixth base end 36 of the reinforcing plate 30 and the fourth base end 24 of the base fixing portion 20. Then, the X-direction plate spring 53B is fixed with a screw to a YZ end surface on the −X side of the base fixing portion 20. With this arrangement, the base connectors 531 of the X-direction plate springs 53A and 53B are respectively disposed along a third inclined surface including the third base end 23 and the fifth base end 35, and a fourth inclined surface including the fourth base end 24 and the sixth base end 36.

Here, in an initial state where the adjusting plate 40 is not affected by a pressing force, the stylus 8C is disposed on a line of intersection of the third inclined surface and the fourth inclined surface along the base connectors 531 of the X-direction plate springs 53A and 53B. In other words, the stylus 8C is disposed on a point of intersection of the line of intersection of the first inclined surface and the second inclined surface and the line of intersection of the third inclined surface and the fourth inclined surface. The X-direction plate springs 53A and 53B bias the reinforcing plate 30 in the X axis direction such that the reinforcing plate 30 and the base fixing portion 20 are relatively positioned to be the above initial state.

On the other hand, the base connectors 531, which are disposed on a surface parallel to the Y axis, are not bent in the Y axis direction. In other words, a displacement of the reinforcing plate 30 in the Y axis direction relative to the base fixing portion 20 can be restricted. Accordingly, when the adjusting plate 40 is pressed in the Y axis direction by the Y-direction adjusting screw 70, the reinforcing plate 30 is not displaced and only the adjusting plate 40 is swung substantially in the Y axis direction.

As shown in FIG. 3, a probe fixing portion 60, which is substantially square C-shaped in cross section, includes: a fixing piece 61 on one of the parallel sides of the square C-shape; a probe fixing piece 62 whose lower surface is formed as a fixing surface 62A for fixing the probe body 8A on the other of the parallel sides of the square C-shape; and a probe connector 63 for connecting the fixing piece 61 with the probe fixing piece 62.

The fixing piece 61 is screwed to the adjusting plate 40 through the Y-direction plate spring 52B of the plate spring 50 as described above. This arrangement integrates the probe fixing portion 60 and the adjusting plate 40. Accordingly, when the adjusting plate 40 is inclined by the X-direction adjusting screw 80 or Y-direction adjusting screw 70, the probe fixing portion 60 is inclined at the same inclination angle as the adjusting plate 40 to adjust the alignment of the probe 8.

The probe body 8A is fixed to the fixing surface 62A (lower surface) of the probe fixing piece 62. In this exemplary embodiment, the probe body 8A is fixed on the Z axis of the fixing surface 62A in the initial state where the adjusting plate 40 is not pressed by the X-direction adjusting screw 80 or Y-direction adjusting screw 70. Thus, the probe body 8A and the shaft 8B are disposed along the Z axis.

The probe connector 63 serves as a portion for connecting the fixing piece 61 with the probe fixing piece 62 and is formed to be a planar surface parallel to an XZ plane in the initial state. Moreover, the probe connector 63 is disposed in contact with the adjustment connector 521 of the Y-direction plate spring 52B.

The Y-direction adjusting screws 70 are provided as a pair in the Y axis direction. A tip of one of the Y-direction adjusting screws 70 is in contact with an adjustment abutting portion 522 of the Y-direction plate spring 52A of the plate spring 50 while a tip of the other of the Y-direction adjusting screws 70 is in contact with the probe connector 63 of the probe fixing portion 60. Here, the adjustment abutting portion 522 of the Y-direction plate spring 52A is in contact with an XZ-end surface on +Y side of the adjusting plate 40 and the probe connector 63 is in contact with an XZ-end surface on −Y side of the adjusting plate 40 through the adjusting abutting portion 522 of the Y-direction plate spring 52B. Accordingly, by advancing and retracting the Y-direction adjusting screws 70 along the Y axis direction, the adjusting plate 40 is pressed to be displaced substantially along the Y axis direction. These Y-direction adjusting screws 70 each are, for instance, provided with a male screw on an axial circumference thereof and is screwed into a female screw formed on, for instance, the external cylinder 11. Positions of the Y-direction adjusting screws 70 can be easily adjusted by screwing.

Figure 7:
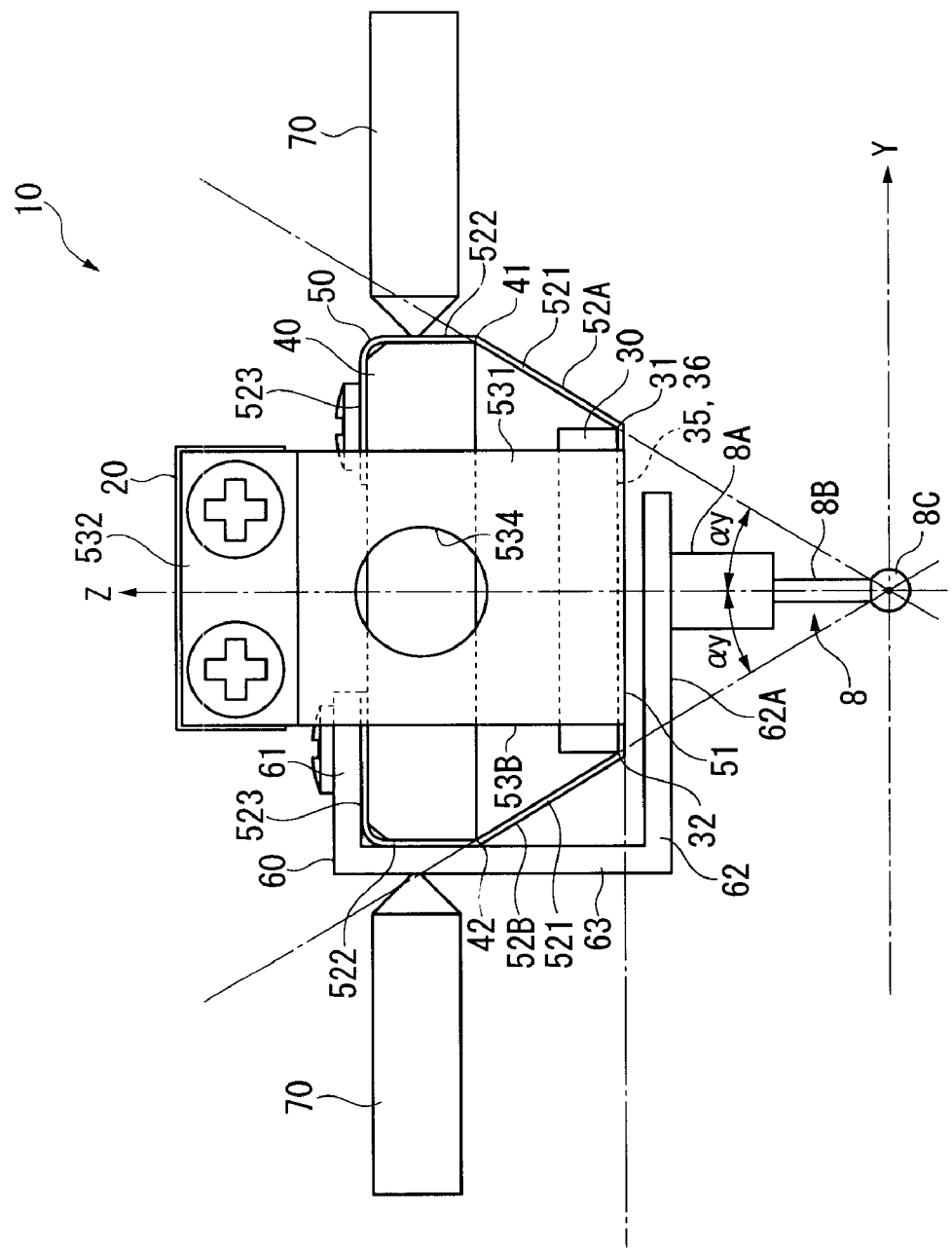
FIG. 7 is a front view showing an initial state of the alignment adjusting mechanism according to the exemplary embodiment seen in the X axis direction.
Figure 8:
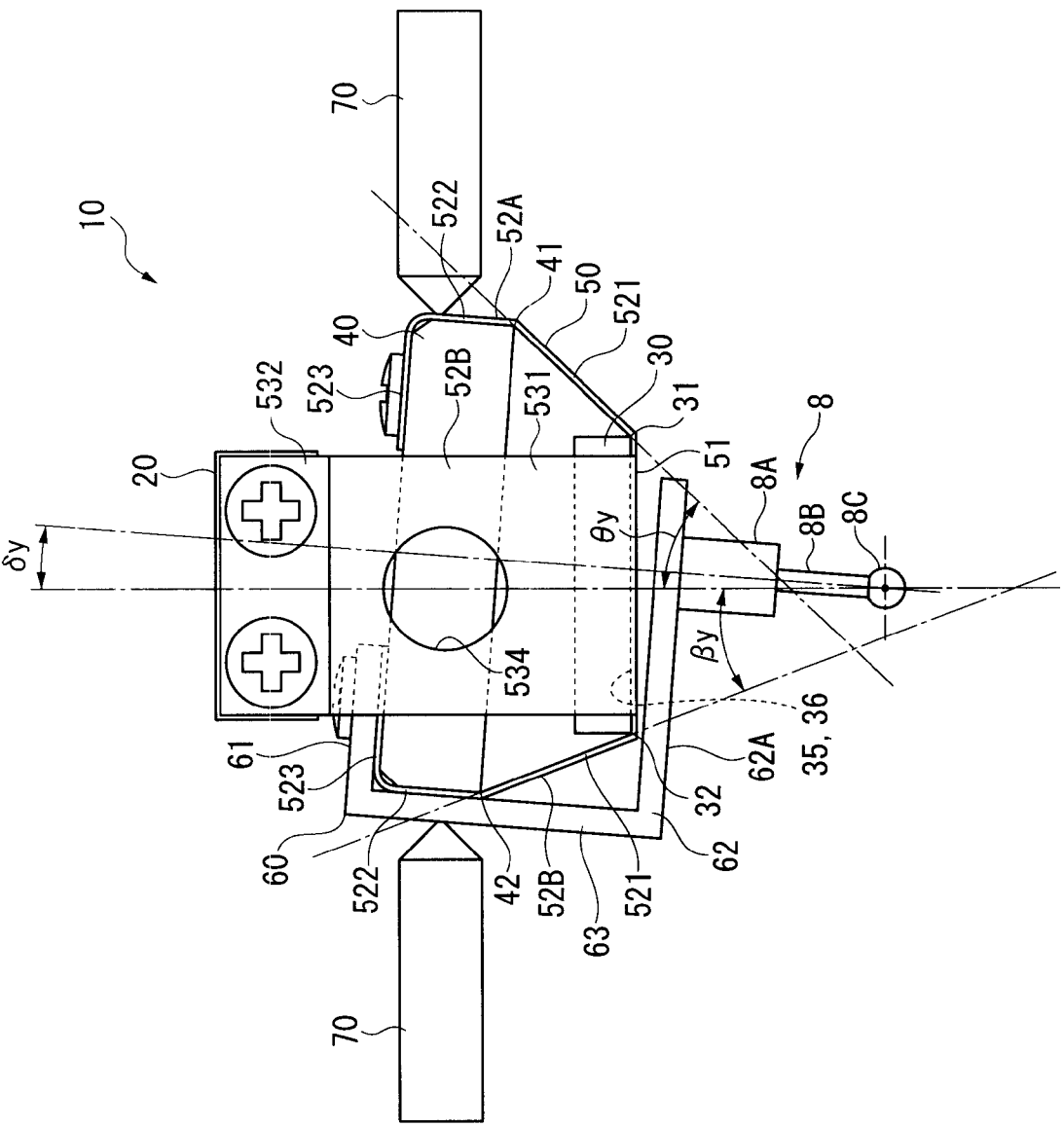
FIG. 8 is a front view showing an inclined state of the adjusting plate caused by adjusting a Y-direction adjusting screw to press the adjusting plate in a +Y axis direction in FIG. 7.

FIG. 7 is a front view showing an initial state of the alignment adjusting mechanism 10 seen in the X axis direction. FIG. 8 is a front view showing an inclined state of the adjusting plate 40 caused by adjusting the Y-direction adjusting screws 70 to press the adjusting plate 40 in +Y axis direction in FIG. 7.

Specifically, as shown in FIG. 8, the first adjustment end 41 of the adjusting plate 40 is rotated around the first base end 31 serving as a central axis and the second adjustment end 42 of the adjusting plate 40 is rotated around the second base end 32 serving as a central axis. Here, as described above, the width in the Y direction of the adjusting plate 40 is larger than that of the reinforcing plate 30 and the first and second inclined surfaces are inclined relative to the Z axis. The reinforcing plate 30 is connected to the base fixing portion 20 by the planar X-direction plate springs 53A and 53B parallel to the Y axis as described above, so that the displacement of the reinforcing plate 30 in the Y axis direction is restricted. For this reason, when the adjusting plate 40 receives a pressing force in the Y axis direction, the reinforcing plate 30 is not displaced, but the adjusting plate 40 is swung substantially in the Y axis direction relative to the reinforcing plate 30. At this time, a rotation angle of the adjustment connector 521 of the Y-direction plate spring 52A is different from a rotation angle of the adjustment connector 521 of the Y-direction plate spring 52B, whereby the adjusting plate 40 becomes inclined. For instance, in the initial state as shown in FIG. 7, an angle formed between the first inclined surface and the Z axis and an angle formed between the second inclined surface and the Z axis are defined as αy. However, as shown in FIG. 8, in the inclined state where the adjusting plate 40 are pressed by the Y-direction adjusting screws 70, an inclination angle between the first inclined surface and the Z axis becomes βy and an inclination angle between the second inclined surface and the Z axis becomes θy that is different from βy. Consequently, the adjusting plate 40 is inclined at a predetermined angle δy. With this inclination, the probe 8, which is integrally fixed to the adjusting plate 40 through the probe fixing portion 60, is also inclined at the angle δy.

The X-direction adjusting screws 80 are provided as a pair in the X axis direction and respectively inserted into the adjusting screw holes 534 provided in the X-direction plate springs 53A and 53B. A tip of one of the X-direction adjusting screws 80 is in contact with a YZ-end surface on +X side and a tip of the other of the X-direction adjusting screws 80 is in contact with a YZ-end surface on −X side, thereby interposing the adjusting plate 40 therebetween. These X-direction adjusting screws 80 each are, for instance, provided with a male screw on an axial circumference thereof and is screwed into a female screw formed on, for instance, the external cylinder 11 to be positioned at a predetermined location. In accordance with the screwed state of the X-direction adjusting screws 80, the adjusting plate 40 is pressed in the X axis direction to be displaced substantially in the X axis.

Figure 9:
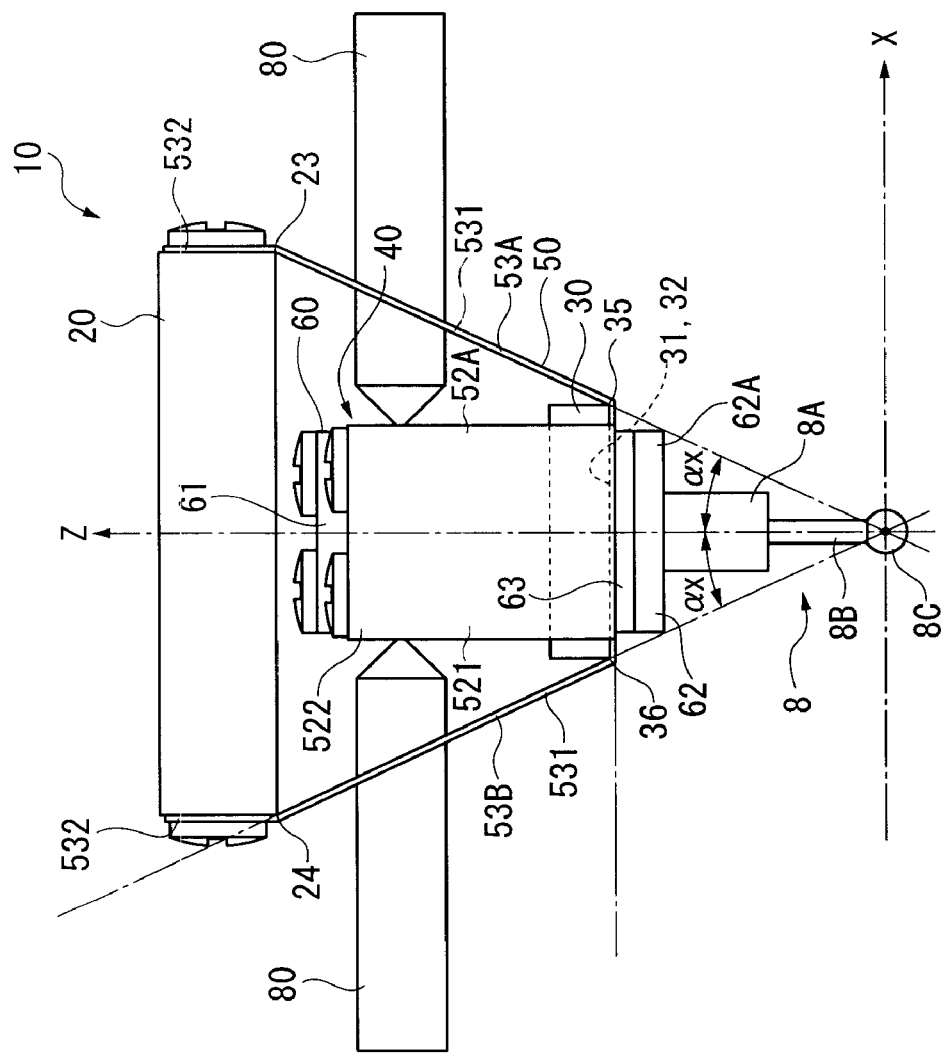
FIG. 9 is a lateral view showing an initial state of the alignment adjusting mechanism according to the exemplary embodiment seen in the Y axis direction.
Figure 10:
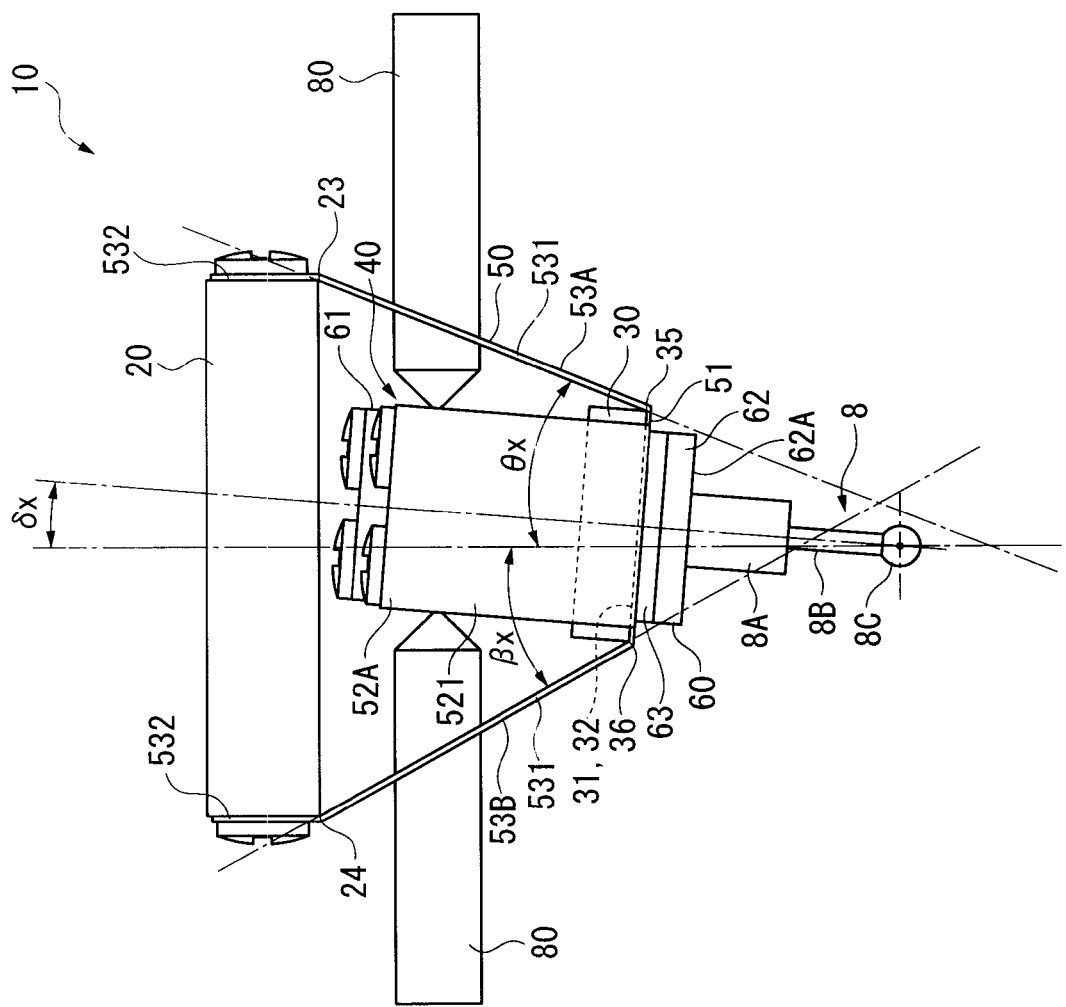
FIG. 10 is a lateral, view showing an inclined state of the adjusting plate caused by adjusting an X-direction adjusting screw to press the adjusting plate in a +X axis direction in FIG. 9.

FIG. 9 is a lateral view showing an initial state of the alignment adjusting mechanism 10 seen in the Y axis direction. FIG. 10 is a lateral view showing an inclined state of the adjusting plate 40 caused by adjusting the X-direction adjusting screws 80 to press the adjusting plate 40 toward +X axis direction in FIG. 9.

Specifically, since the displacement of the adjusting plate 40 is restricted in the X axis direction relative to the reinforcing plate 30, when the adjusting plate 40 is pressed to be displaced by the X-direction adjusting screws 80, the reinforcing plate 30 is also displaced at the same amount of displacement. At this time, the fifth base end 35 of the reinforcing plate 30 is rotated around the third base end 23 (serving as a central axis) of the base fixing portion 20 and the sixth base end 36 is rotated around the fourth base end 24 serving as a central axis. Here, as described above, the width in the X direction of the base fixing portion 20 is larger than that of the reinforcing plate 30 and the third and fourth inclined surfaces are inclined relative to the Z axis. For this reason, when the adjusting plate 40 receives a pressing force in the X axis direction, a rotation angle of the base connector 531 of the X-direction plate spring 53A and a rotation angle of the base connector 531 of the X-direction plate spring 53B are different from each other, thereby inclining the reinforcing plate 30. For instance, in the initial state as shown in FIG. 9, an angle formed between the third inclined surface and the Z axis and an angle formed between the fourth inclined surface and the Z axis are defined as αx. However, as shown in FIG. 10, in the inclined state where the adjusting plate is pressed by the X-direction adjusting screws 80, an inclination angle between the third inclined surface and the Z axis becomes βx and an inclination angle between the fourth inclined surface and the Z axis becomes θx that is different from βx. Consequently, the reinforcing plate 30 is inclined at a predetermined angle δx. Moreover, as described above, the adjusting plate 40 is connected to the reinforcing plate 30 by the planar Y-direction plate springs 52A and 52B to be restricted in the displacement in the X axis direction relative to the reinforcing plate 30. Accordingly, the adjusting plate 40 is also inclined at the angle δx integrally with the reinforcing plate 30.

A screwed amount of the Y-direction adjusting screws 70 and the X-direction adjusting screws 80 as described above may be controllable by a controller. With this arrangement, the pressing force to the adjusting plate 40 in the X axis and Y axis directions is finely adjusted by an electronic controller, thereby providing more precise alignment adjustment of the probe 8.

Method for Probe Alignment Adjustment and Alignment Adjustment Principle

In the profile measuring instrument 100 as described above, in order to adjust the alignment of the probe 8, a screwed amount of the X-direction adjusting screws 80 and the Y-direction adjusting screws 70 are adjusted, thereby adjusting inclination of the adjusting plate 40. In this exemplary embodiment, as shown in FIGS. 7 and 8, alignment adjustment of the probe 8 in a YZ-planar direction orthogonal to the X axis is performed by adjusting the screwed amount of the Y-direction adjusting screws 70. As shown in FIGS. 9 and 10, alignment adjustment of the probe 8 in an XZ-planar direction orthogonal to the Y axis is performed by adjusting the screwed amount of the X-direction adjusting screws 80. Thus, by adjusting both of the Y-direction adjusting screws 70 and the X-direction adjusting screws 80, the probe 8 can be three-dimensionally adjusted at a desirable angle. The screwed amounts of the Y-direction adjusting screws 70 and the X-direction adjusting screws 80 are adjusted while an operator confirms an inclined state of the tip of the probe 8 by a microscope (not shown). At this time, in the above profile measuring instrument 100, the displacement of the stylus 8C at alignment adjustment of the probe 8 is just small to cause no such a disadvantage as the stylus 8C being out of the visual field of the microscope, so that the alignment adjustment of the probe 8 can be easily and speedily performed.

This is because the stylus 8C of the probe 8 is disposed on the point of intersection of the line of intersection of the first inclined surface and the second inclined surface and the line of intersection of the third inclined surface and the fourth inclined surface in the initial state. With this arrangement, the stylus 8C is displaced according to the following principle.

Figure 11:
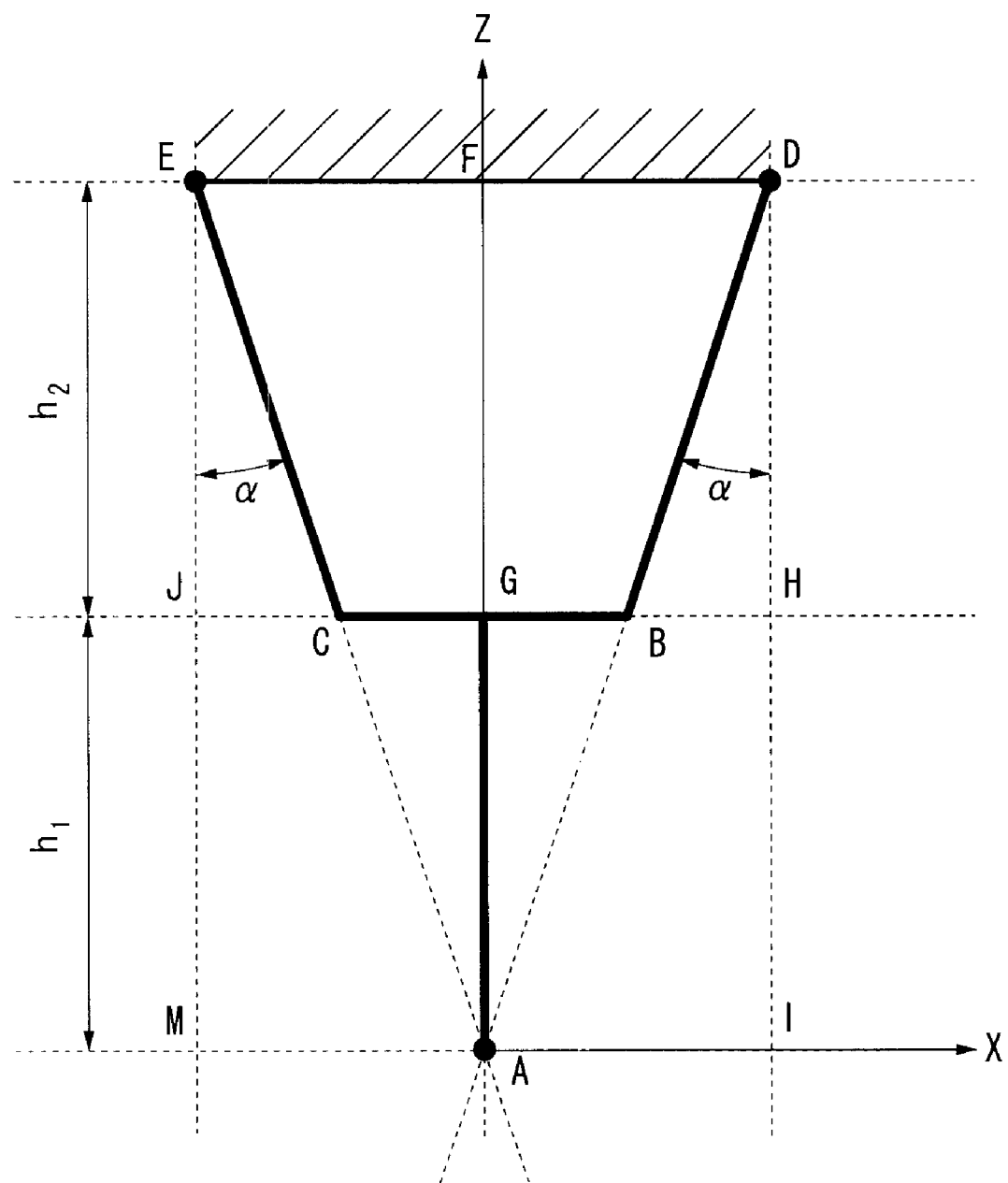
FIG. 11 is a schematic illustration showing an initial state of a lateral side of the alignment adjusting mechanism according to the exemplary embodiment.
Figure 12:
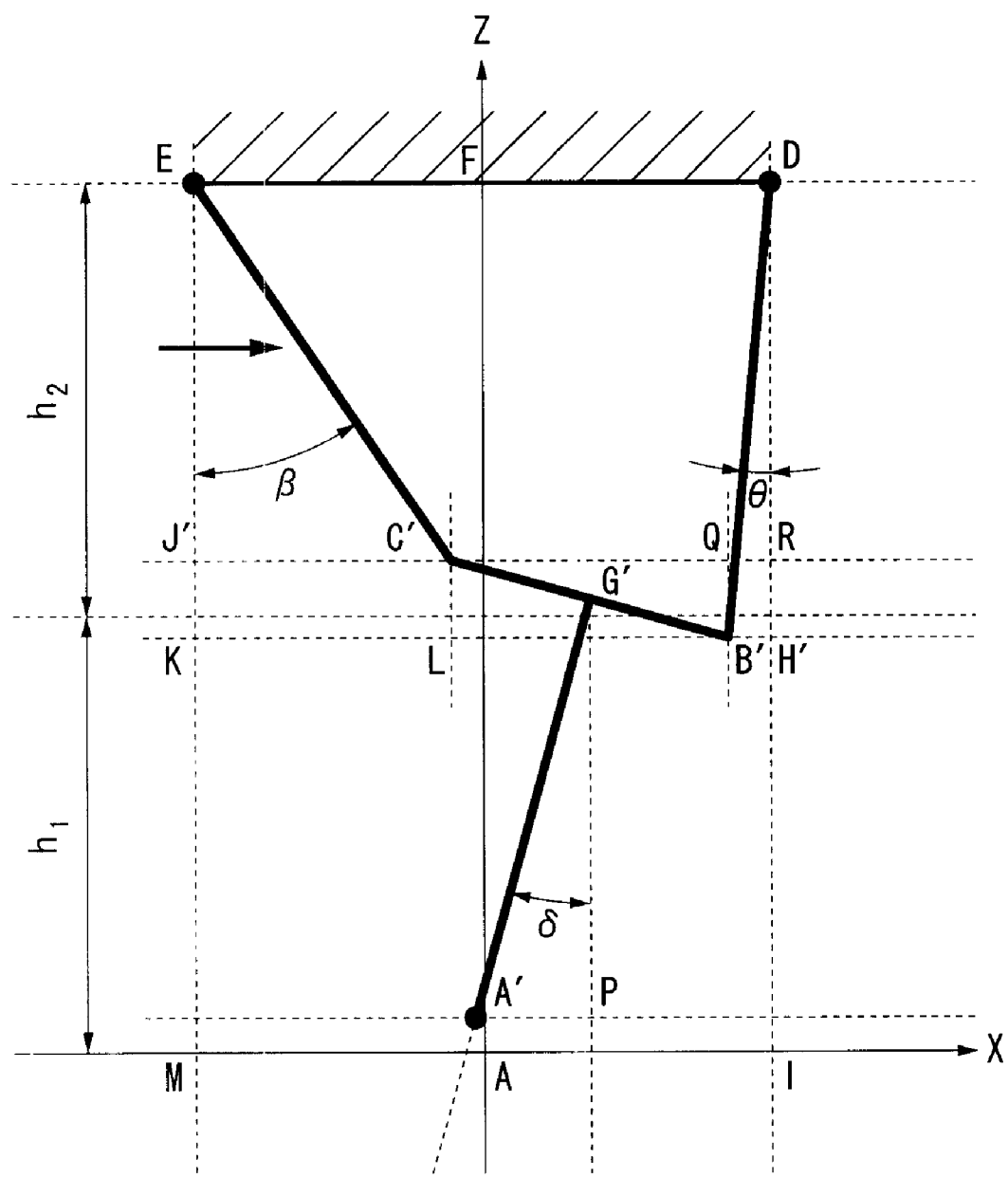
FIG. 12 is a schematic illustration showing an inclined state of the lateral side of the alignment adjusting mechanism according to the exemplary embodiment.
Figure 13:
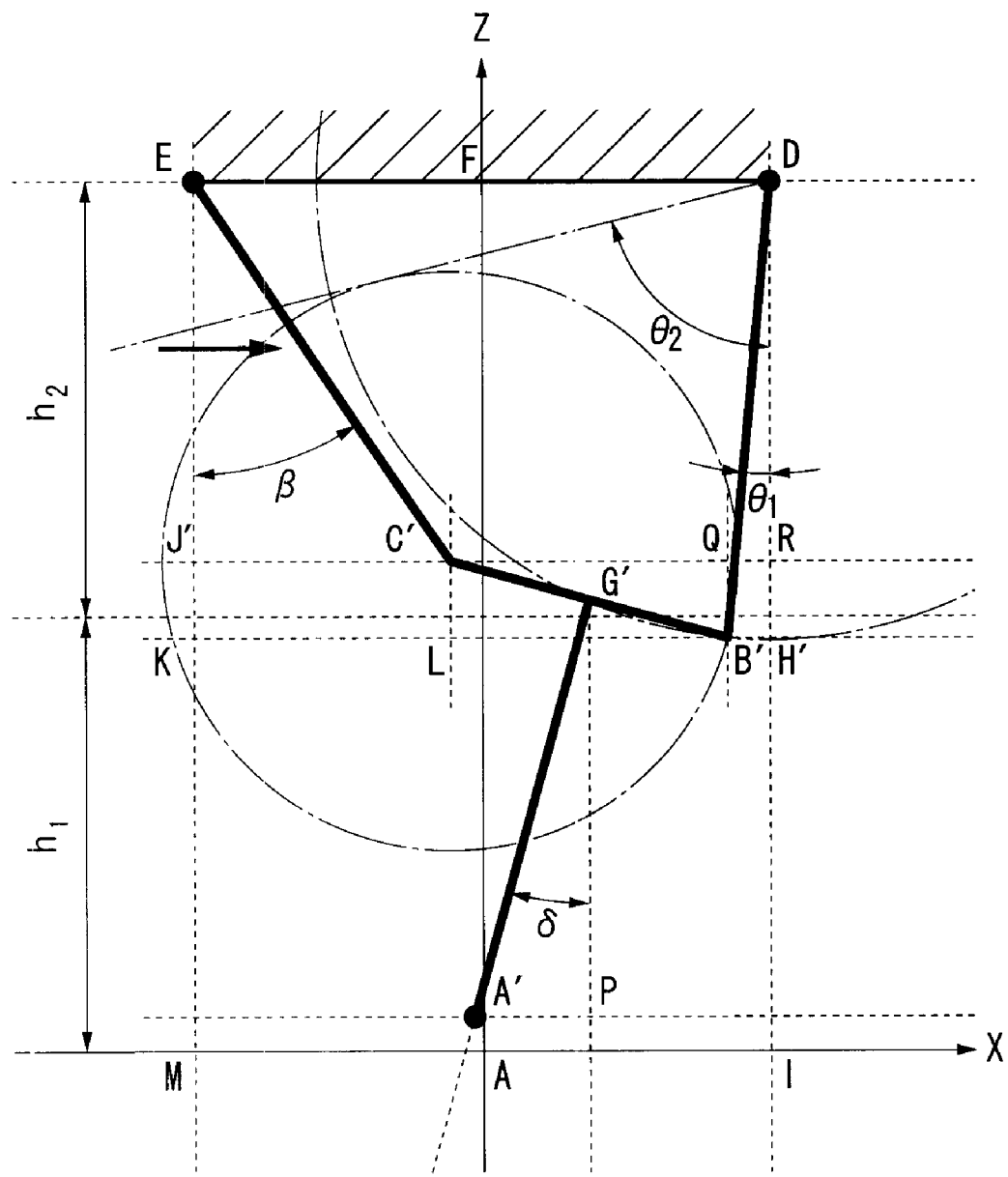
FIG. 13 is a schematic illustration showing an inclined state of the lateral side of the alignment adjusting mechanism according to the exemplary embodiment.

FIGS. 11 to 13 each are a schematic illustration showing the principle of the alignment adjusting mechanism 10 according to the aspect of the invention. FIG. 11 is a schematic illustration of the initial state of a side of the alignment adjusting mechanism 10. FIGS. 12 and 13 each are a schematic illustration of the inclined state of the side of the alignment adjusting mechanism 10. Here, in order to simplify the explanation, only a case where the adjusting plate 40 is pressed by the X-direction adjusting screws 80 in the X axis direction is exemplarily shown. However, even when the adjusting plate 40 is pressed by the Y-direction adjusting screws 70 in the Y axis direction, the alignment adjustment is also performed by the same principle.

In FIGS. 11 to 13, points A, B, C, D, E and G respectively indicate coordinate positions of the stylus 8C, the fifth base end 35 and the sixth base end 36 of the reinforcing plate 30, third base end 23 and the fourth base end 24 of the base fixing portion 20 and a connecting point (probe connecting point) of the probe body 8A and the probe fixing piece 62, in which the coordinate position A of the stylus 8C is defined as an origin. Here, in order to simplify the explanation, thickness of the reinforcing plate 30, the plate spring 50 and the probe fixing piece 62 are ignored and it is assumed that the probe connecting point G is located at a midpoint of the fifth base end 35 and the sixth base end 36 of the reinforcing plate 30.

A length of the shaft of the probe is defined as h1 and a distance between the base fixing portion 20 and the reinforcing plate 30 is defined as h2. The third inclined surface BD and the fourth inclined surface CE are respectively inclined at an angle $\alpha$ relative to the Z axis.

In such a model, the coordinate positions of the points A to G are respectively shown as follows.

$A(xa,za)=(0,0)$ $B(xb,zb)=(h1\tan\alpha,h1)$ $C(xc,zc)=(-h1\tan\alpha,h1)$ $D(xd,zd)=((h1+h2)\tan\alpha,h1+h2)$ $E(xe,ze)=(-(h1+h2)\tan\alpha,h1+h2)$ $G(xg,zg)=(0,h1)$ A length of a segment ED connecting the third base end 23 and the fourth base end 24 of the base fixing portion 20 is defined as $ED=2(h1+h2)\tan\alpha$. A distance between the third base end 23 and the fifth base end 35 and a distance between the fourth base end 24 and the sixth base end 36 are respectively defined as $EC=DB=h2/\cos\alpha$. A dimension of a segment CB connecting the fifth base end 35 and the sixth base end 36 of the reinforcing plate 30 is defined as $CB=2CG=2GB=2h1\tan\alpha$.

As shown in FIG. 12, when the adjusting plate 40 is pressed to incline the reinforcing plate 30, the fourth inclined surface is inclined at an angle $\beta$ relative to the Z axis. At this time, the third inclined surface is supposed to be inclined at an angle $\theta$ relative to the Z axis to cause an inclined state where the probe 8 is inclined at the angle $\delta$ relative to the Z axis. When the stylus 8C, the fifth base end 35 and the sixth base end 36 of the reinforcing plate 30 and the probe connecting point are respectively displaced to points A', B', C' and G', the coordinates of points B', C' and G' are shown as follows.

$B'(xb',zb')=((h1+h2)\tan\alpha-h2\sin\theta/\cos\alpha, h1+h2-h2\cos\theta/\cos\alpha)$ $C'(xc',zc')=(-(h1+h2)\tan\alpha+h2\sin\beta/\cos\alpha, h1+h2-h2\cos\beta/\cos\alpha)$ $G'(xg',zg')=(h2(\sin\beta-\sin\theta)/2\cos\alpha, h1+h2-h2(\cos\beta-\cos\theta)/\cos\alpha)$ In FIG. 12, perpendiculars are drawn from the points E, C' and D to a straight line parallel to the X axis passing through the point B', the intersections of which are respectively defined as points K, L and H'. A segment KH' can be represented by a formula (1) as follows.

$$KH'=KL+LB'+B'H'=ED=2((h_1+h_2)\tan\alpha) \tag{1}$$

Segments KL, LB', B' and H' are respectively represented by formulae (2) to (4) as follows.

$$KL=C'J'=h_2\frac{\sin\beta}{\cos\alpha} \tag{2}$$

$$LB'=\sqrt{(C'B')^2-(C'L)^2}=\sqrt{4h_1^2\tan^2\alpha-\left\{\frac{h_2(\cos\beta-\cos\theta)}{\cos\alpha}\right\}^2} \tag{3}$$

$$B'H'=h_2\frac{\sin\theta}{\cos\alpha} \tag{4}$$

By substituting the formula (1) into the formulae (2) to (4), the following formula (5) can be obtained.

$$X\sin\theta+Y\cos\theta-Z=0 \tag{5}$$

where:

$X=2h_2^2\sin\beta-4h_2(h_1-h_2)\sin\alpha$ $Y=-2h_2^2\cos\beta$ $-Z=8h_1h_2\sin^2\alpha+4h_2^2\sin^2\alpha+2h_2^2-4h_2(h_1+h_2)\sin\alpha\sin\beta$ An inclination angle $\theta$ of the first inclined surface is obtained by a formula (6) as follows using the above formula (5).

$$\theta=\arcsin\left(\frac{ZX\pm\sqrt{Z^2X^2+(X^2+Y^2)(Z^2-Y^2)}}{X^2+Y^2}\right) \tag{6}$$

Here, two solutions $\theta 1$ and $\theta 2$ ($\theta 1<\theta 2$) are obtained by the formula (6). The angles $\theta 1$ and $\theta 2$ are calculated and illustrated in FIG. 13. As shown in FIG. 13, since the fifth base end 35 is not displaced beyond the sixth base end 36, the inclination angle of the first inclined surface is defined as $\theta=\theta 1$ during the alignment adjustment.

An inclination angle of the reinforcing plate 30, i.e., an inclination of a segment C'B' is obtained by $(zC'-zB')/(xC'-xB')$. The adjusting plate 40 and the reinforcing plate 30 are integrally displaced in the X axis direction by the Y-direction plate springs 52A and 52B. The probe fixing portion 60 is fixed to the adjusting plate 40. The probe 8 is fixed to the probe fixing portion 60. Accordingly, the probe 8 is inclined at the same inclination as the reinforcing plate 30. Moreover, since the probe 8 is provided so as to be perpendicular to the probe fixing piece 62 of the probe fixing portion 60, an inclination of the probe 8 is defined as $-(xC'-xB')/(zC'-zB')$. Accordingly, an inclination angle $\delta$ of the probe 8 is calculated according to a formula (7) below.

$$\delta=\arctan\left(-\frac{x_{C'}-x_{B'}}{z_{C'}-z_{B'}}\right) \tag{7}$$

By the formula (7) and the coordinates of a connecting point G' of the probe 8, coordinates (xA', zA') of the coordinate position A' of the stylus 8C in the inclined state can be obtained as shown in formulae (8) and (9) below.

$$\begin{cases} x_{A'} = A'P - AP = h_1\sin\theta - h_2\dfrac{\sin\beta - \sin\theta}{2\cos\alpha} & (8) \\ z_{A'} = AG' - G'P = h_1 + h_2 - h_2\dfrac{\cos\beta - \cos\theta}{\cos\alpha} - h_1\cos\delta & (9) \end{cases}$$

Figure 14:
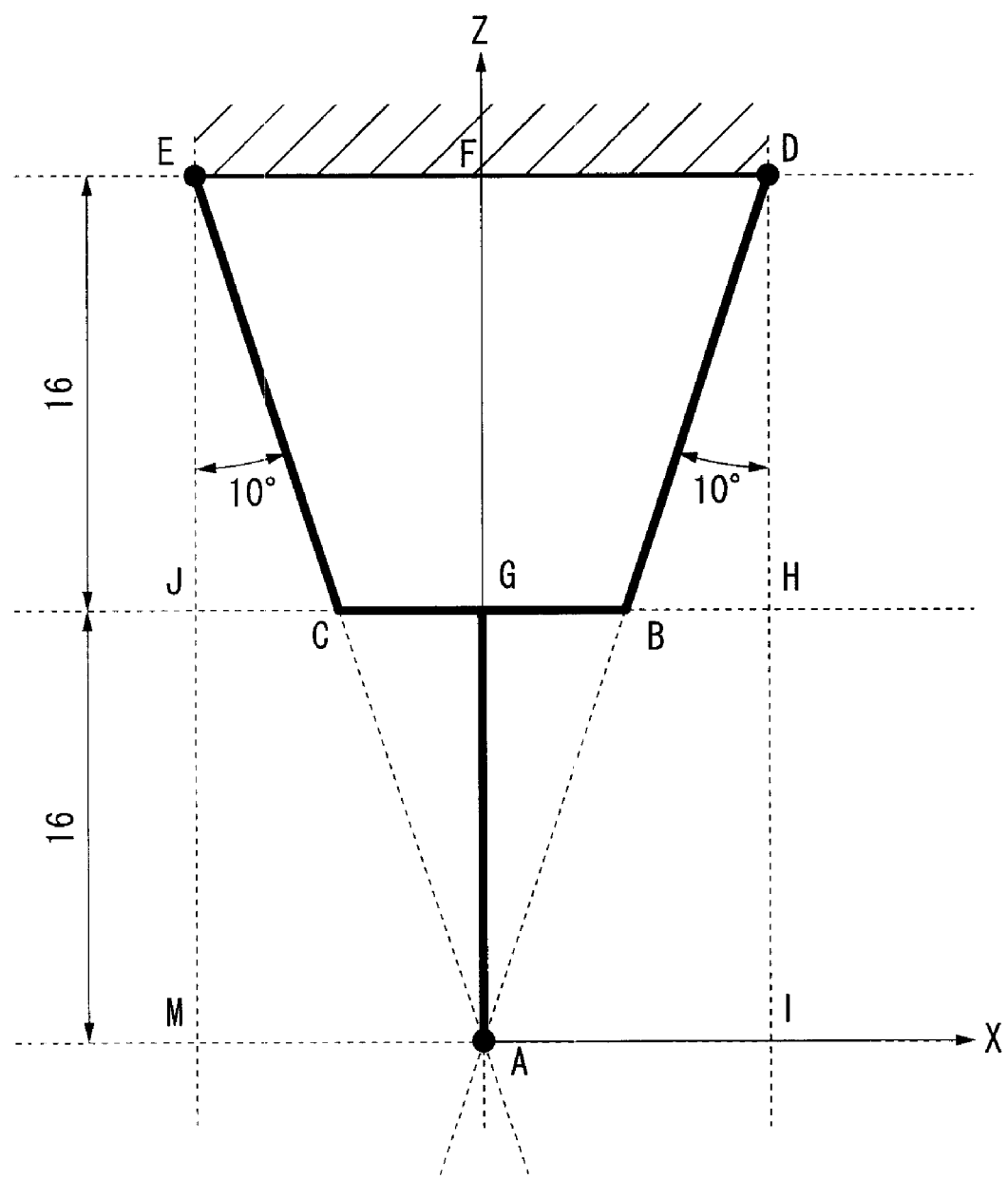
FIG. 14 shows an exemplary dimension of the alignment adjusting mechanism according to the exemplary embodiment.

An amount of the displacement of the stylus 8C of the alignment adjusting mechanism 10 dimensioned as shown in FIG. 14 is shown as an example. A conventional alignment adjusting mechanism using a goniostage dimensioned as shown in FIG. 15 is shown as a comparative example.

FIG. 14 shows an example in which the inclination angles of the third and fourth inclined surfaces in the initial state are respectively defined as 10 degrees and the heights are respectively set as h1=h2=16 (mm). In the alignment adjusting mechanism 10, when the adjusting plate 40 is pressed to set the inclination angle of the base connector 531 of the X-direction plate spring 53B at 12 degrees, the angles and coordinates of the displaced stylus 8C are calculated as follows according to the above formulae (6), (7), (8) and (9): θ=8.024 (deg) according to the formula (6); δ=1.99 (deg) according to the formula (7); and (xA', zA')=(−0.0006900,0.0198799) according to the formulae (8) and (9), (xA', zA') being a coordinate position of the displaced stylus 8C. In other words, in calculation, the probe 8 is inclined at 1.99 degrees and the stylus 8C is displaced approximately by 0.69 μm in the −X axis direction and by 19.8 μm in the +Z axis direction.

Figure 15:
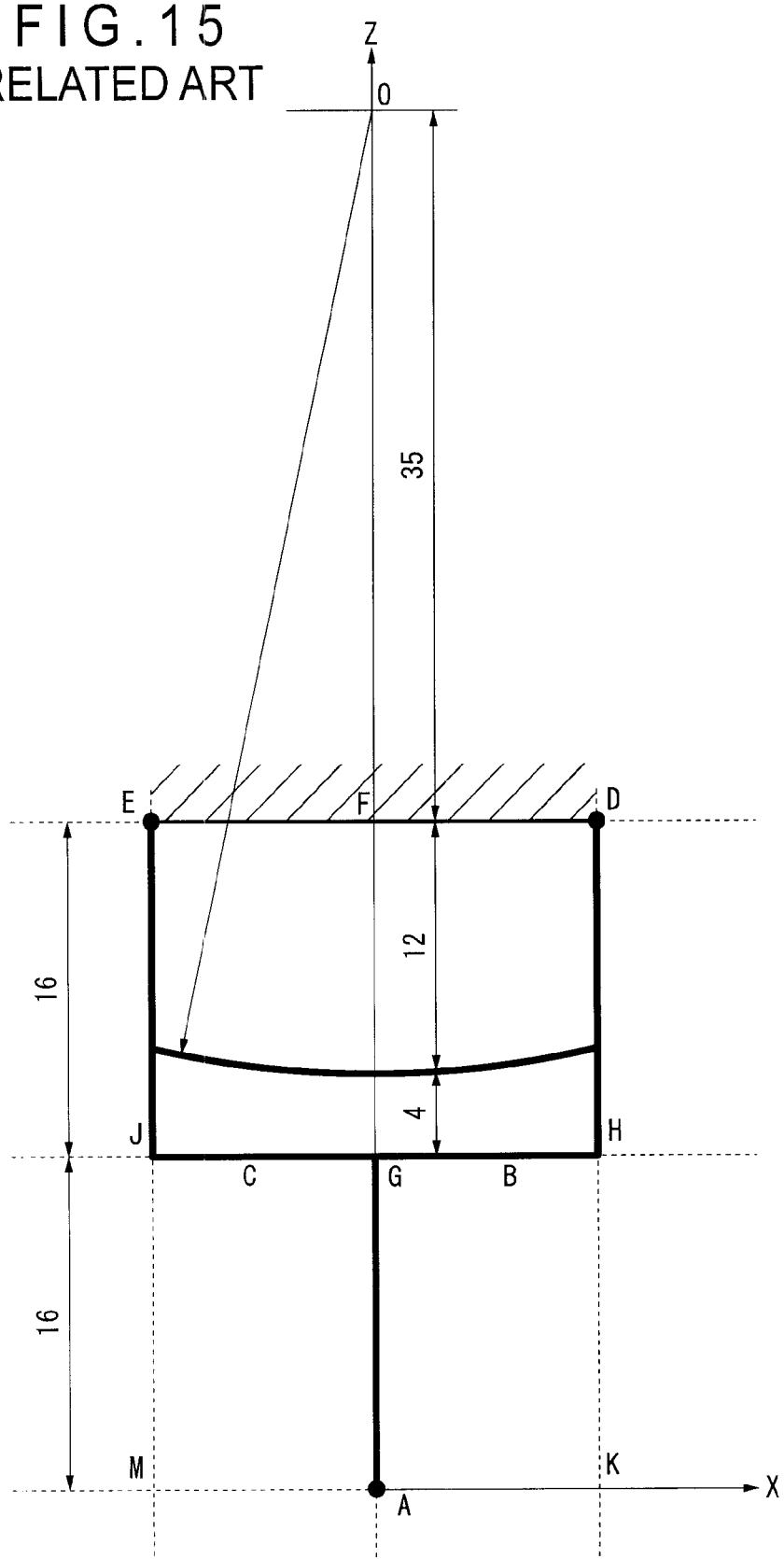
FIG. 15 shows an exemplary dimension of a conventional alignment adjusting mechanism as a Comparative Example.
Figure 16:
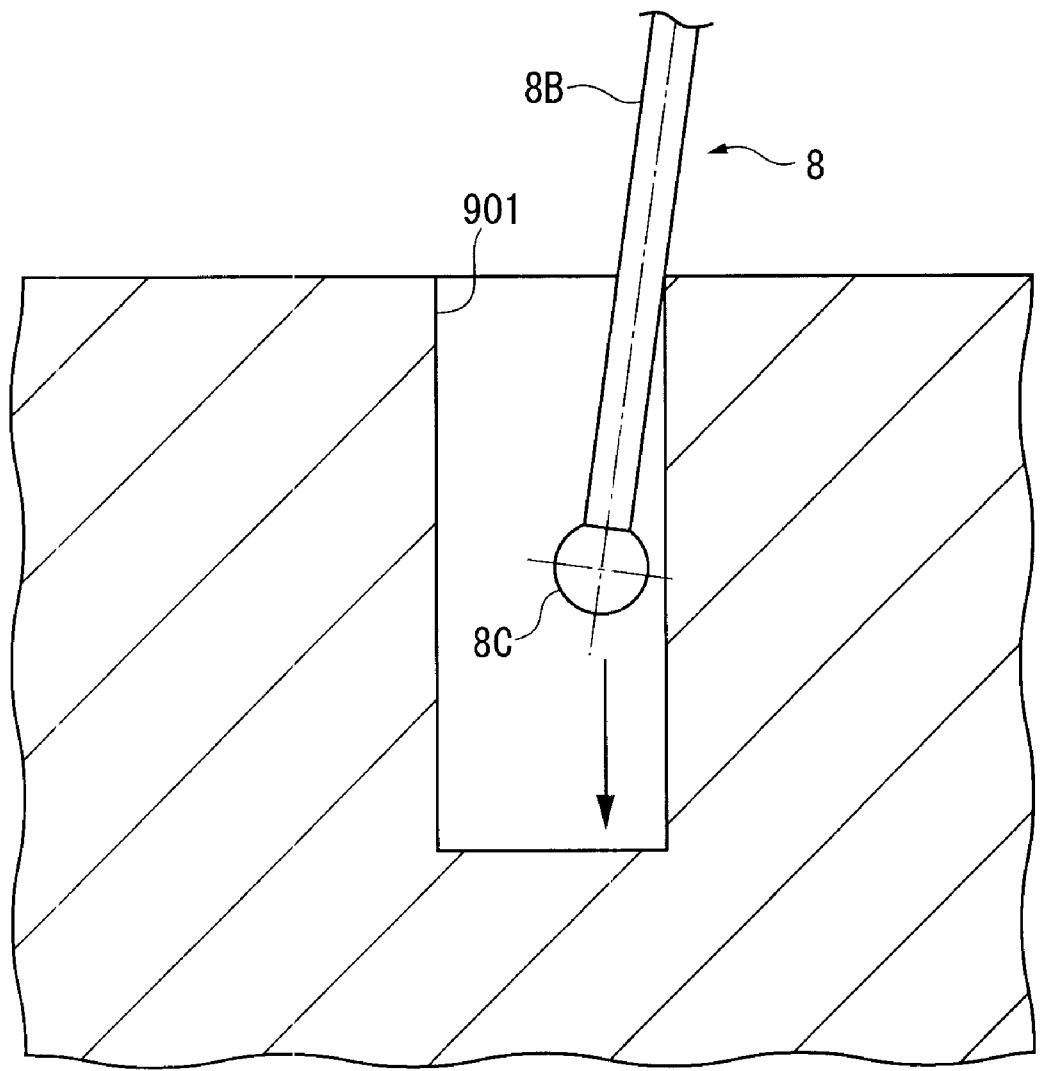
FIG. 16 illustrates a probe in contact with a part of a hole.
Figure 17:
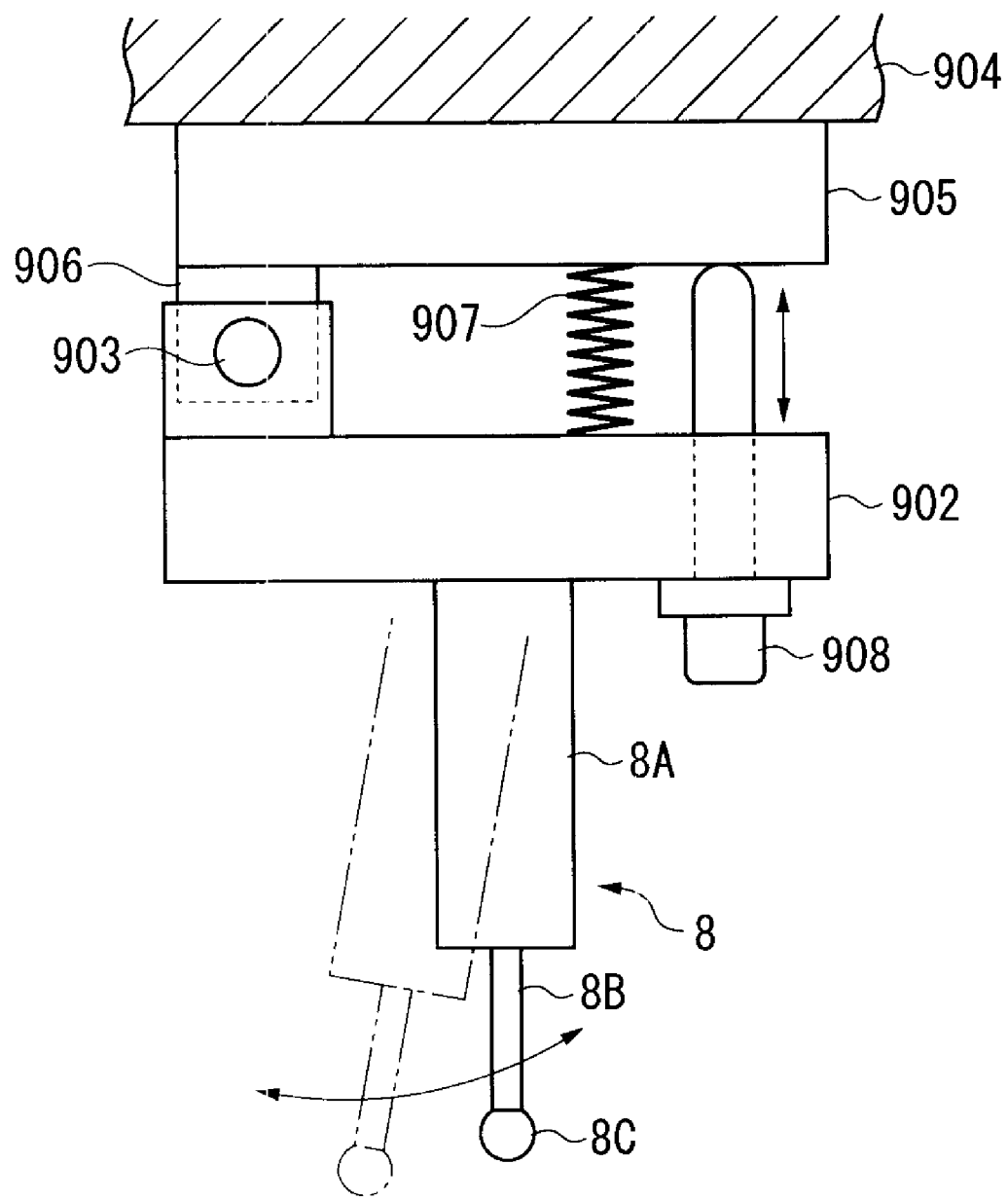
FIG. 17 illustrates a conventional alignment adjusting mechanism of a probe.
Figure 18:
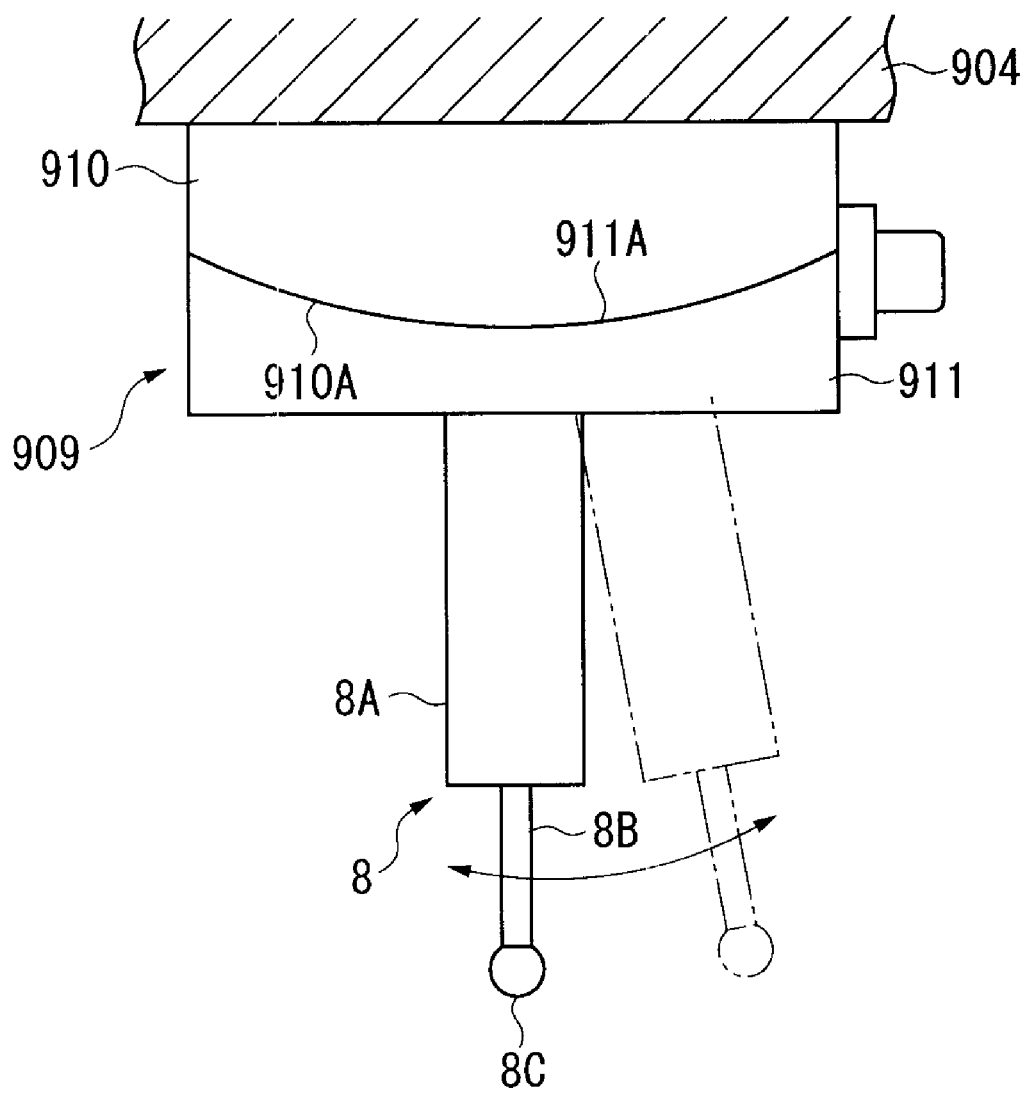
FIG. 18 illustrates another conventional alignment adjusting mechanism of a probe.

As shown in FIG. 15, a probe 8 having the same length (16 mm) as in FIG. 14 is fixed at a center of a lower surface of a goniostage (manufactured by Edmond Optics Inc.: Product Code; 55838-J, curvature radius (R)=47 mm) having the same thickness (16 mm) as the dimension in the Z axis direction of the alignment adjusting mechanism 10 in FIG. 14. The alignment adjusting mechanism is inclined at the same degree (2 degrees) as in FIG. 14 to incline the probe 8. When a location of the stylus is calculated, a coordinate position of the displaced stylus 8C is (xA',zA')=(OA' sin 2°,OA'−OA' cos 2°)≈(2.34,0.041). In short, in calculation, the stylus is displaced by 2.34 mm in the +X axis direction and by 0.041 mm in the +Z axis direction.

As described above, in the conventional alignment adjusting mechanism as shown in FIG. 15, the stylus is largely displaced by the alignment of the probe 8. However, in the alignment adjusting mechanism 10 according to the aspect of the invention, the displacement of the stylus 8C can be restrained at an extremely small level, whereby the alignment adjustment of the probe 8 can be sufficiently performed within an effective field of a microscope.

In FIGS. 11 to 13, an explanation is given for the alignment adjustment of the probe 8 caused by pressing the adjusting plate 40 in the X axis direction. The same principle applies to the alignment adjustment of the probe 8 caused by pressing the adjusting plate 40 in the Y axis direction, thereby calculating an inclination angle δ of the probe 8 and a coordinate position of the stylus 8C. In other words, in the alignment adjustment of the probe 8 caused by pressing the adjusting plate 40 in the Y axis direction, the alignment adjustment in the X axis direction can be explained by replacing the respective components as follows: the first adjustment end 41 and the second adjustment end 42 of the adjusting plate 40 are respectively defined as points B and C; the first base end 31 and the second base end 32 of the reinforcing plate 30 are respectively defined as points D and E since a relative location between the reinforcing plate 30 and the base fixing portion 20 is not altered in the Y axis direction; and a segment BC is defined to be shorter than a segment DE and disposed closer to the +Z axis than the segment DE. Thus, the alignment adjustment in the Y axis direction can be performed by substantially the same principle as the alignment adjustment in the X axis direction as described above. Accordingly, the displacement of the stylus 8C can be sufficiently reduced with respect to the alignment adjustment.

Advantage of Embodiment

As describe above, in the alignment adjusting mechanism 10 of the profile measuring instrument 100 in the above exemplary embodiment, the base fixing portion 20 is fixed to the lower surface of the Z-slider 6 and the reinforcing plate 30 is positioned at a predetermined distance apart from the base fixing portion 20. A pair of the third base end 23 and the fourth base end 24 on the YZ-end surface of the base fixing portion 20 which are parallel to the Y axis and a pair of the fifth base end 35 and the sixth base end 36 on the YZ-end surface of the reinforcing plate 30 which are parallel to the Y axis are connected by the X-direction plate springs 53A and 53B of the plate spring 50, whereby the displacement of the reinforcing plate 30 in the X axis direction is restricted. The adjusting plate 40 is positioned at a predetermined distance apart from the reinforcing plate 30. The first adjustment end 41 and the second adjustment end 42 on the XZ-end surface of the adjusting plate 40 which are parallel to the X axis and the first base end 31 and the second base end 32 on the XZ-end surface of the reinforcing plate 30 which are parallel to the X axis are connected by the Y-direction plate springs 52A and 53B of the plate spring 50. The adjusting plate 40 is fixed with the probe fixing portion 60, to which the probe 8 is fixed. In the initial state, the stylus 8C of the probe 8 is disposed on the line of intersection of the first inclined surface formed by the first adjustment end 41 and the first base end 31 and the second inclined surface formed by the second adjustment end 42 and the second base end 32. Further, the adjusting plate 40 is provided with the Y-direction adjusting screws 70 in the Y axis direction and can be swung by being pressed by the Y-direction adjusting screws 70.

With this arrangement, the adjusting plate 40 is swung by being pressed by the Y-direction adjusting screws 70 and is inclined depending on the pressed amount. Since the displacement of the reinforcing plate 30 is restricted in the Y axis direction, the first adjustment end 41 of the adjusting plate 40 is rotated around the first base end 31 (serving as a central axis) of the reinforcing plate 30 and the second adjustment end 42 of the adjusting plate 40 is rotated around the second base end 32 (serving as a central axis) of the reinforcing plate 30, so that the adjusting plate 40 is inclined. At this time, the adjusting plate 40 is swung around the line of intersection of the first and second inclined surfaces or in the proximity of the line of intersection. Accordingly, as long as the stylus 8C is disposed on the line of intersection, the displacement of the stylus 8C can be restrained at a small level. Accordingly, even when an operator performs alignment adjustment while confirming a state of the stylus 8C on the tip of the probe 8 by a microscope, the stylus does not go out of an effective visual field of the microscope. Accordingly, without complication of operations such as removal of the microscope or alteration of magnification, the alignment adjustment of the stylus 8C can be performed. With this simple arrangement in which the pressed amount of the adjusting plate 40 is restricted by the screwed amount of the Y-direction adjusting screws 70 to perform alignment adjustment of the probe 8, even when a profile of a small-sized object (e.g., several mm in size) is measured, the alignment adjusting mechanism 10 can easily be reduced in size and controlled.

Moreover, the base fixing portion 20 and the reinforcing plate 30 are connected by the X-direction plate springs 53A and 53B of the plate spring 50. With this arrangement, the reinforcing plate 30 can be swung in the X axis direction relative to the base fixing portion 20. In the initial state, the stylus 8C is disposed on the line of intersection of the first inclined surface formed by the first adjustment end 41 and the first base end 31 and the second inclined surface formed between the second adjustment end 42 and the second base end 32. Further, the adjusting plate 40 is provided with the X-direction adjusting screws 80 in the X axis direction. The adjusting plate 40 is pressed by the X-direction adjusting screws 80, thereby swinging the reinforcing plate 30 in the X axis direction.

Accordingly, inclination adjustment of the probe in the X axis direction as well as in the Y axis direction as described above can be performed. By approximately setting the screwed amounts of both the X-direction adjusting screws 80 and Y-direction adjusting screws 70. the alignment adjustment of the probe can be more precisely performed.

The plate spring 50 includes a pair of planar adjustment connectors 521 along the first and second inclined surfaces and a pair of planar base connectors 531 along the third and fourth inclined surfaces. The plate spring 50 biases the reinforcing plate 30 and the adjusting plate 40 so that the reinforcing plate 30 is disposed in the initial state relative to the base fixing portion 20 and the adjusting plate 40 is disposed in the initial state relative to the reinforcing plate 30. Accordingly, the pressing force applied by the Y-direction adjusting screws 70 and the X-direction adjusting screws 80 is dispersed over the entirety of the planar base connectors 531 and adjustment connectors 521. Consequently, the reinforcing plate 30 is not displaced in the Y axis direction by, for instance, pressing the adjusting plate 40 by the Y-direction adjusting screws 70 and the adjusting plate 40 is not displaced in the X axis direction relative to the reinforcing plate 30, so that the alignment adjustment of the probe 8 can be more precisely performed.

The plate spring 50 includes the bottom 51, the X-direction plate springs 53A and 53B extending from the bottom 51 in the X axis direction and the Y-direction plate springs 52A and 52B extending from the bottom 51 in the Y axis direction, in which the X-direction plate springs 53A and 53B include the base connectors 531 and the Y-direction plate springs 52A and 52B include the adjustment connectors 521. Accordingly, compared with an arrangement in which a plurality of plate springs are used for connecting the base fixing portion 20, the reinforcing plate 30 and the adjusting plate 40 respectively, the number of parts can be reduced and production efficiency can be improved.

Further, by using the Invar (trademark) material as the plate spring 50, deformation caused by thermal expansion can be prevented. Particularly, when a material having a large thermal expansion rate is used as the plate spring 50 in the small-sized alignment adjusting mechanism 10, the adjusting plate 40 is inclined by the deformation of the plate spring 50 caused by thermal expansion, where precise alignment adjustment becomes difficult. However, in the exemplary embodiment according to the aspect of the invention, such a deformation of the plate spring 50 can be restrained. The adjusting plate 40 and the reinforcing plate 30 are displaced only by the screwed amounts of the Y-direction adjusting screws 70 and the X-direction adjusting screws 80. Thus, the adjusting plate 40 and the reinforcing plate 30 are not inclined by other factors. Accordingly, the alignment adjustment of the probe can be more precisely performed.

Other Embodiment(s)

The invention is not limited to the exemplary embodiments as described above but includes modifications and improvements as long as an object of the invention can be achieved.

For instance, in the above exemplary embodiment, the planar base connectors 531 and adjustment connectors 521 are exemplarily formed by bending a single piece of plate spring 50. However, the base connectors 531 and the adjustment connectors 521 may not be planar. For instance, as long as the adjustment connectors 521 connect the first adjustment end 41 with the first base end 31 and connect the second adjustment end 42 with the second base end 32, and the base connectors 531 connect the third base end 23 with the fifth base end 35 and connect the fourth base end 24 with the sixth base end 36, the base connectors 531 and the adjustment connectors 521 may be formed in an arc.

The base connectors 531 and the adjustment connectors 521 are formed by, for instance, bending the plate spring 50, but a forming method thereof is not limited to this bending of a single plate spring. For instance, the adjustment connectors 521 may be provided with plate members along the first and second inclined surfaces respectively, in which the plate member on the first inclined surface may be connected by a plate spring with the first adjustment end 41 of the adjusting plate 40 and the first base end 31 of the reinforcing plate 30; and the plate member on the second inclined surface may be connected by a plate spring with the second adjustment end 42 and the second base end 32. Similarly, plate members may be respectively disposed on the third and fourth inclined surfaces as a base connecting member. These members may be connected by a plate spring with the reinforcing plate 30 and the base fixing portion 20.

The base connectors 531 and the adjustment connectors 521 are exemplarily formed by bending a single piece of plate spring 50. However, plate springs may be provided by separate members respectively disposed along the first, second, third and fourth inclined surfaces for forming the base connectors 531 and the adjustment connectors 521.

The Y-direction adjusting screws 70 and the X-direction adjusting screws 80 each are formed with a male screw on outer circumference thereof and are screwed into a female screw hole formed in the external cylinder 11, but the arrangement of the Y-direction adjusting screws 70 and the X-direction adjusting screws 80 is not limited to this. For instance, a screwed amount may be set by other members. Further, the screwed amounts of the Y-direction adjusting screws 70 and the X-direction adjusting screws 80 may be adjustable by a controller.

An inclination adjuster is exemplified by the Y-direction adjusting screws 70 and the X-direction adjusting screws 80, but is not limited thereto. For instance, the inclination adjuster may be a pin member provided so as to be advanceable and retractable in the Y and X axis directions, which the pin member may be axially advanced and retracted by a driving force such as a motor.

Further, the specific arrangements and process in the exemplary embodiment of the invention may be altered in any manner as long as an object of the invention can be achieved.

What is claimed is:

1. An alignment adjusting mechanism, comprising:
an adjusting plate having a first adjustment end and a second adjustment end which are parallel to each other in a first direction;
a probe fixing portion integrated with the adjusting plate;
a probe that is fixed to the probe fixing portion and that has a shaft and a stylus formed on a tip of the shaft;
a base that is connected with a measuring instrument body and that has a first base end and a second base end which are parallel to each other in the first direction;
an inclination adjuster that presses the adjusting plate in a direction parallel to a planar direction of the adjusting plate and substantially in a second direction orthogonal to the first direction; and
adjustment connectors that respectively connect the first adjustment end with the first base end and the second adjustment end with the second base end, wherein
the base is connected with the measuring instrument body while a displacement of the base in the second direction is restricted, and
the stylus is disposed on a line of intersection of: a first inclined surface including the first adjustment end of the adjusting plate and the first base end of the base; and a second inclined surface including the second adjustment end of the adjusting plate and the second base end of the base, when the adjusting plate is not pressed by the inclination adjuster.

2. The alignment adjusting mechanism according to claim 1, wherein
the adjustment connector is disposed along the first and second inclined surfaces.

3. The alignment adjusting mechanism according to claim 2, wherein
the adjustment connector is a plate spring and biases the adjusting plate to a position at which the adjusting plate is not pressed by the inclination adjuster.

4. The alignment adjusting mechanism according to claim 1, further comprising:
a second inclination adjuster that presses the adjusting plate in a direction parallel to the planar direction of the adjusting plate and substantially in the first direction, wherein
the base includes:
a base fixing portion that is fixed to the measuring instrument body and that has a third base end and a fourth base end parallel to the second direction;
a base swinging portion that has a fifth base end and a sixth base end parallel to the second direction as well as the first base end and the second base end; and
base connectors that respectively connect the third base end with the fifth base end and the fourth base end with the sixth base end, wherein
the stylus is disposed on a point of intersection of: the line of intersection of the first inclined surface and the second inclined surface; and the line of intersection of a third inclined surface including the third base end and the fifth base end and a fourth inclined surface including the fourth base end and the sixth base end, when the adjusting plate is not pressed by the inclination adjuster and the second inclination adjuster.

5. A measuring instrument, comprising:
an adjusting plate having a first adjustment end and a second adjustment end which are parallel to each other in a first direction;
a probe fixing portion integrated with the adjusting plate;
a probe that is fixed to the probe fixing portion and that has a shaft and a stylus formed on a tip of the shaft;
a base that is connected with a measuring instrument body and that has a first base end and a second base end which are parallel to each other in the first direction;
an inclination adjuster that presses the adjusting plate in a direction parallel to a planar direction of the adjusting plate and substantially in a second direction orthogonal to the first direction;
adjustment connectors that respectively connect the first adjustment end with the first base end and the second adjustment end with the second base end; and
a measuring unit that detects a position of the stylus when the stylus is in contact with an object to be measured to measure a profile of the object, wherein
the base is connected with the measuring instrument body while a displacement of the base in the second direction is restricted, and
the stylus is disposed on a line of intersection of: a first inclined surface including the first adjustment end of the adjusting plate and the first base end of the base; and a second inclined surface including the second adjustment end of the adjusting plate and the second base end of the base, when the adjusting plate is not pressed by the inclination adjuster.

* * * * *